(12) United States Patent
Yi et al.

(10) Patent No.: US 9,134,952 B2
(45) Date of Patent: Sep. 15, 2015

(54) TERMINAL AND CONTROL METHOD THEREOF

(71) Applicant: LG ELECTRONICS INC., Seoul (KR)

(72) Inventors: Eunhee Yi, Seoul (KR); Jinhee Lee, Seoul (KR); Junhee Yeo, Seoul (KR); Kiho Lee, Seoul (KR); Jinyung Park, Seoul (KR); Minjung Kim, Seoul (KR); Doyoung Lee, Seoul (KR); Younghyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 14/155,982

(22) Filed: Jan. 15, 2014

(65) Prior Publication Data

US 2014/0303971 A1    Oct. 9, 2014

Related U.S. Application Data

(60) Provisional application No. 61/807,771, filed on Apr. 3, 2013.

(30) Foreign Application Priority Data

Jun. 24, 2013 (KR) .................. 10-2013-0072534

(51) Int. Cl.
   *G10L 21/00* (2013.01)
   *G10L 25/00* (2013.01)
   (Continued)

(52) U.S. Cl.
   CPC .... *G06F 3/16* (2013.01); *G06F 3/165* (2013.01); *G06F 3/167* (2013.01); *H04M 1/605* (2013.01); *H04M 1/72519* (2013.01); *G06F 1/1694* (2013.01); *G06F 2200/1614* (2013.01); *G06F 2200/1637* (2013.01); *H04M 2250/12* (2013.01)

(58) Field of Classification Search
   CPC ................. H04M 1/608; G10L 15/24
   USPC .................. 381/104, 108; 704/225
   See application file for complete search history.

(56) References Cited

U.S. PATENT DOCUMENTS 5,276,916 A * 1/1994 Pawlish et al. ............. 455/575.1
5,712,911 A * 1/1998 Her ......................... 379/388.01

(Continued)

FOREIGN PATENT DOCUMENTS

| KR | 10-2004-0108492 A | 12/2004 |
|----|-------------------|---------|
| KR | 10-2008-0089719 A | 10/2008 |
| KR | 10-2011-0019162 A | 2/2011  |

OTHER PUBLICATIONS

Lu, Hong, et al. "SoundSense: scalable sound sensing for people-centric applications on mobile phones." Proceedings of the 7th international conference on Mobile systems, applications, and services. ACM, 2009.*

*Primary Examiner* — Matthew Baker
(74) *Attorney, Agent, or Firm* — Birch, Stewart, Kolasch & Birch, LLP

(57) ABSTRACT

This specification provides a terminal including a microphone that is configured to receive a user's voice input for controlling an operation of the terminal, an analyzing unit that is configured to sense a degree of proximity between the user's mouth and the microphone while the voice is input, an output unit that is configured to output at least one of visible data and audible data based on the voice, and a controller that is configured to restrict the output of the audible data when the degree of proximity is smaller than a preset range and a volume of the voice is below a preset reference volume.

20 Claims, 18 Drawing Sheets

(51) Int. Cl.
*H04M 1/00* (2006.01)
*H04M 3/00* (2006.01)
*H04B 1/38* (2015.01)
*G09G 5/00* (2006.01)
*G01J 5/00* (2006.01)
*G06F 3/16* (2006.01)
*H04M 1/60* (2006.01)
*H04M 1/725* (2006.01)
*G06F 1/16* (2006.01)

(56) References Cited

U.S. PATENT DOCUMENTS

| | | | |
|---|---|---|---|
| 6,545,612 B1* | 4/2003 | Lindgren et al. | 340/686.6 |
| 6,567,101 B1* | 5/2003 | Thomas | 345/649 |
| 6,813,491 B1* | 11/2004 | McKinney | 455/414.1 |
| 6,853,850 B2* | 2/2005 | Shim et al. | 455/550.1 |
| 6,952,672 B2* | 10/2005 | Smith | 704/226 |
| 7,469,155 B2* | 12/2008 | Chu | 455/567 |
| 7,536,297 B2* | 5/2009 | Byrd et al. | 704/10 |
| 7,657,252 B2* | 2/2010 | Futami | 455/412.1 |
| 7,714,265 B2* | 5/2010 | Fadell et al. | 250/214 AL |
| 7,966,188 B2* | 6/2011 | Ativanichayaphong et al. | 704/275 |
| 7,983,920 B2* | 7/2011 | Sinclair, II | 704/270 |
| 8,130,193 B2* | 3/2012 | Flynt et al. | 345/156 |
| 8,189,429 B2* | 5/2012 | Chen et al. | 367/118 |
| 8,290,543 B2* | 10/2012 | Emery et al. | 455/569.1 |
| 8,306,815 B2* | 11/2012 | Konig et al. | 704/233 |
| 8,363,820 B1* | 1/2013 | Graham | 379/390.03 |
| 8,488,411 B2* | 7/2013 | Chen et al. | 367/118 |
| 8,532,285 B2* | 9/2013 | Coughlan et al. | 379/433.02 |
| 8,594,744 B2* | 11/2013 | Emery et al. | 455/569.1 |
| 8,614,431 B2* | 12/2013 | Huppi et al. | 250/559.36 |
| 8,618,482 B2* | 12/2013 | Katz et al. | 250/338.1 |
| 8,838,085 B2* | 9/2014 | Forutanpour et al. | 455/418 |
| 2002/0021278 A1* | 2/2002 | Hinckley et al. | 345/156 |
| 2003/0139921 A1* | 7/2003 | Byrd et al. | 704/10 |
| 2004/0127198 A1* | 7/2004 | Roskind et al. | 455/412.2 |
| 2006/0085183 A1* | 4/2006 | Jain | 704/233 |
| 2006/0093161 A1* | 5/2006 | Falcon | 381/104 |
| 2006/0167691 A1* | 7/2006 | Tuli | 704/258 |
| 2007/0075965 A1* | 4/2007 | Huppi et al. | 345/156 |
| 2007/0293188 A1* | 12/2007 | Houghton et al. | 455/404.2 |
| 2008/0043934 A1* | 2/2008 | Gallick | 379/52 |
| 2008/0129666 A1* | 6/2008 | Shimotono et al. | 345/87 |
| 2008/0147397 A1* | 6/2008 | Konig et al. | 704/246 |
| 2008/0254822 A1* | 10/2008 | Tilley | 455/550.1 |
| 2009/0204404 A1* | 8/2009 | Jarman et al. | 704/260 |
| 2010/0002015 A1* | 1/2010 | Handa | 345/650 |
| 2010/0046766 A1* | 2/2010 | Gregg et al. | 381/59 |
| 2010/0081487 A1* | 4/2010 | Chen et al. | 455/575.1 |
| 2010/0128904 A1* | 5/2010 | Hanna et al. | 381/107 |
| 2010/0131749 A1* | 5/2010 | Kim et al. | 713/100 |
| 2010/0228711 A1* | 9/2010 | Li et al. | 707/706 |
| 2010/0315485 A1 | 12/2010 | Song et al. | |
| 2011/0013075 A1 | 1/2011 | Kim et al. | |
| 2012/0016678 A1* | 1/2012 | Gruber et al. | 704/275 |
| 2012/0179458 A1 | 7/2012 | Oh et al. | |
| 2012/0183099 A1* | 7/2012 | Harrat et al. | 375/319 |
| 2013/0038634 A1* | 2/2013 | Yamada et al. | 345/649 |
| 2013/0065652 A1* | 3/2013 | Nicholson | 455/570 |
| 2013/0094668 A1* | 4/2013 | Poulsen et al. | 381/107 |
| 2013/0107129 A1* | 5/2013 | Britt, Jr. | 348/734 |
| 2013/0190054 A1* | 7/2013 | Kulas | 455/566 |
| 2013/0201219 A1* | 8/2013 | Zhao et al. | 345/649 |
| 2013/0234927 A1* | 9/2013 | Roh | 345/156 |
| 2013/0310110 A1* | 11/2013 | Forutanpour et al. | 455/556.1 |
| 2014/0004908 A1* | 1/2014 | Park et al. | 455/566 |
| 2014/0044286 A1* | 2/2014 | Coles et al. | 381/150 |
| 2014/0194102 A1* | 7/2014 | Strazisar et al. | 455/418 |
| 2014/0267006 A1* | 9/2014 | Raffa et al. | 345/156 |

* cited by examiner

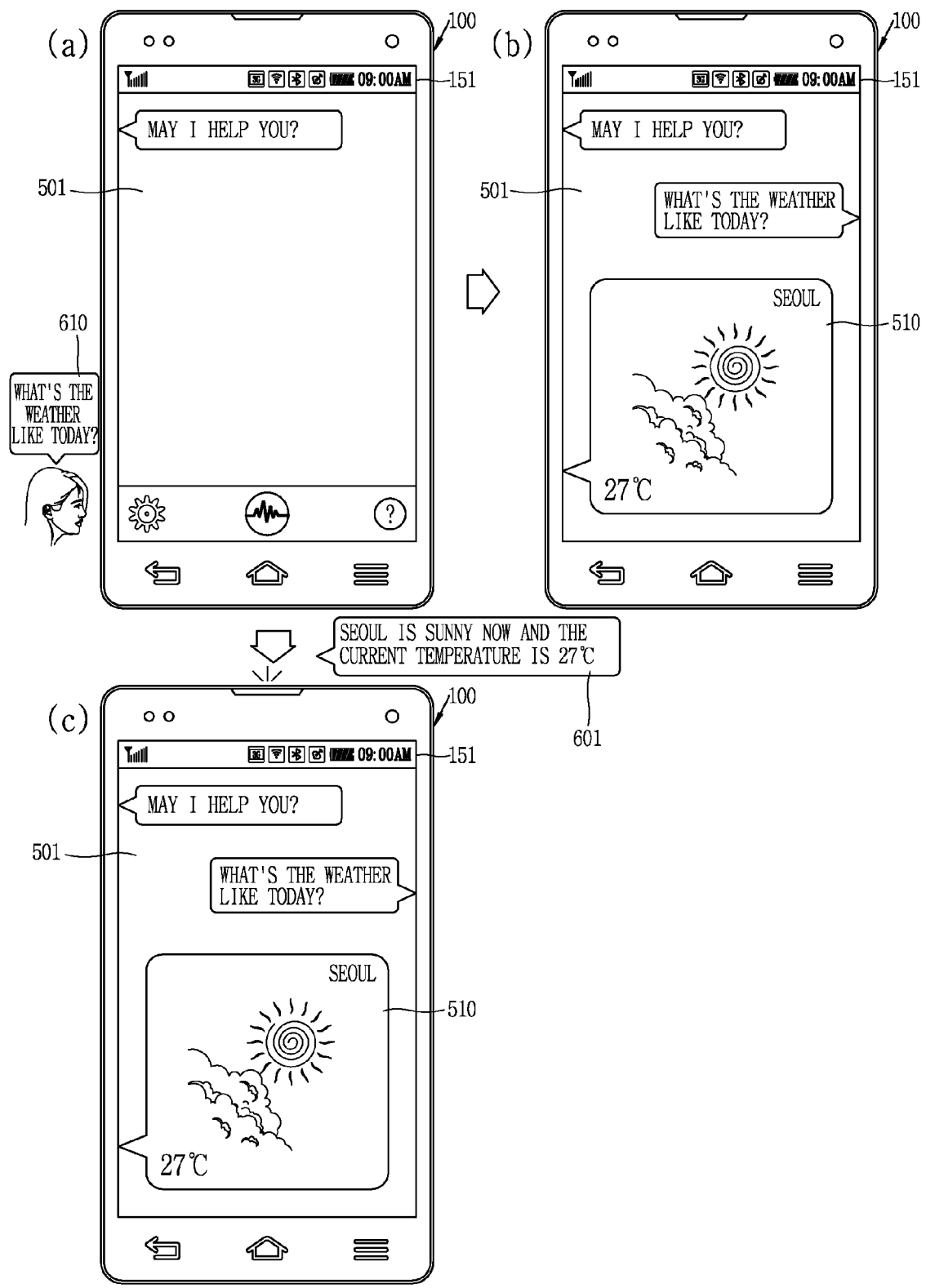

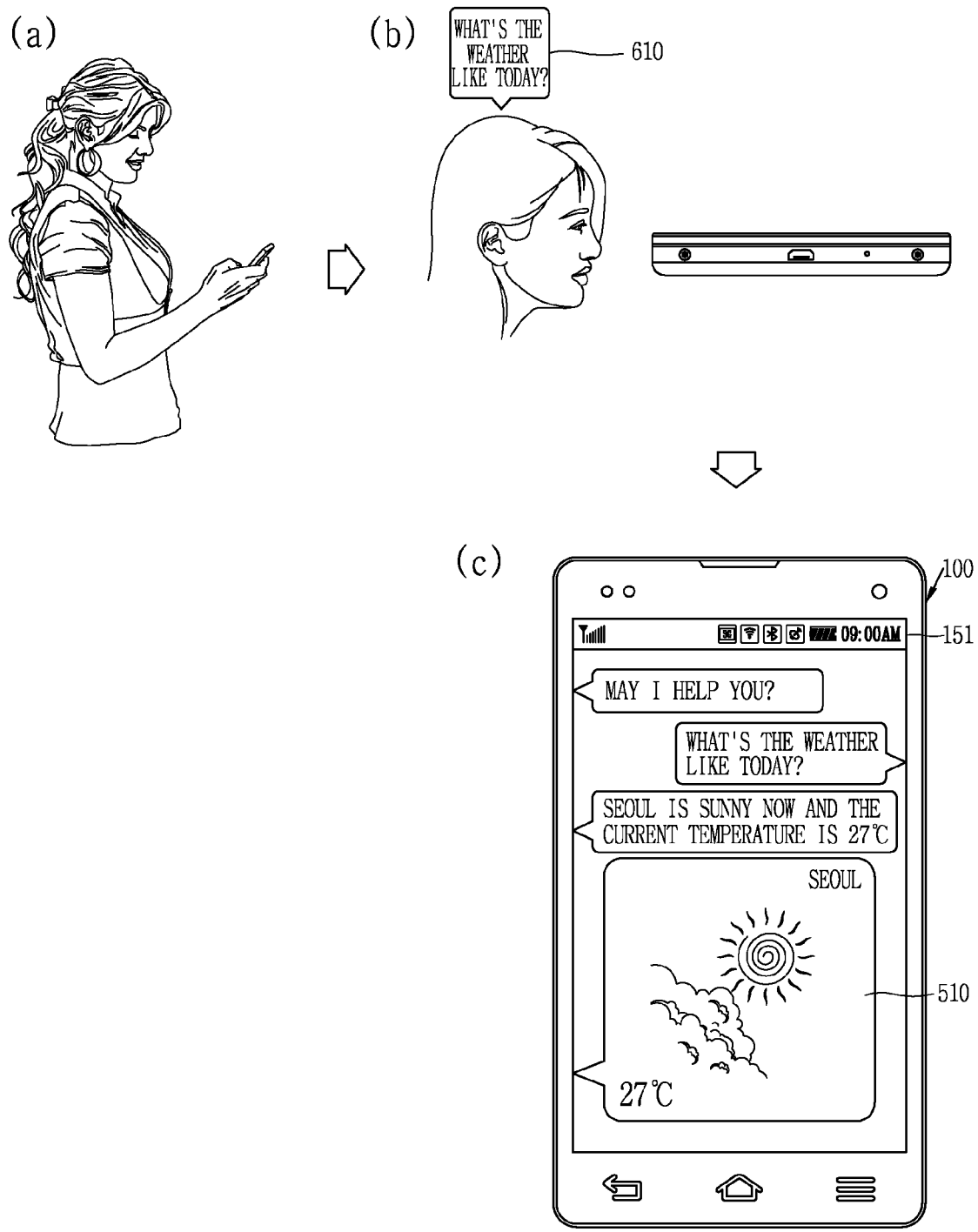

TERMINAL AND CONTROL METHOD THEREOF

CROSS-REFERENCE TO RELATED APPLICATION

Pursuant to 35 U.S.C. §119(a), this application claims the benefit of earlier filing date and right of priority to U.S. Application No. 61/807,771, filed in USPTO on Apr. 3, 2013 and Korean Application No. 10-2013-0072534, filed in Republic of Korea on Jun. 24, 2013, the contents of which are incorporated by reference herein in their entireties.

BACKGROUND OF THE DISCLOSURE

1. Field of the Disclosure

This specification relates to a mobile terminal capable of executing an operation in response to a received voice.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

In recent time, the mobile terminal provides a voice recognition mode, in which a function of the mobile terminal is executed by recognizing a user's voice, so as to improve user convenience. Also, the mobile terminal notifies the user that an operation has been executed by way of providing visible and audible data corresponding to the operation.

Here, even under the condition that the output of the audible data has to be restricted (limited) according to statuses of the user and the mobile terminal, such data may disadvantageously be output in the same manner unless the user separately controls it.

SUMMARY OF THE DISCLOSURE

Therefore, an aspect of the detailed description is to provide a mobile terminal capable of restricting an output of data by analyzing a user's voice.

To achieve these and other advantages and in accordance with the purpose of this specification, as embodied and broadly described herein, there is provided a terminal including a microphone that is configured to receive a user's voice input for controlling an operation of the terminal, an analyzing unit that is configured to analyze an attribute of the voice, a sensing unit that is configured to sense a degree of proximity between the user's mouth and the microphone while the voice is input, an output unit that is configured to output at least one of visible data and audible data based on the voice, and a controller that is configured to restrict the output of the audible data when the degree of proximity is smaller than a preset range and a volume of the voice is below a preset reference volume.

In accordance with one exemplary embodiment, the analyzing unit may sort the input voice based on a preset criterion, and the controller may control the output unit to restrict the output of the audible data when the voice includes a preset attribute.

In accordance with one exemplary embodiment, the controller may control the output unit to restrict the output of the audible data when the voice includes an attribute of whispering including a rustling sound.

In accordance with one exemplary embodiment, the analyzing unit may analyze at least one of nuance, speed, strength and degree of echo corresponding to the attribute of the voice, and sort the voice based on the present criterion to restrict the output of the audible data.

In accordance with one exemplary embodiment, the controller may analyze an external environment of the terminal based on an external sound input through the microphone, and restrict the output of the audible data based on the external environment.

In accordance with one exemplary embodiment, the controller may control the output unit to restrict the output of the audible data when a difference between a volume of the external sound and the volume of the voice is below the reference volume.

In accordance with one exemplary embodiment, the controller may control the output unit to restrict the output of the audible data when the volume of the external sound is below the reference volume.

In accordance with one exemplary embodiment, the sensing unit may further include a gyro sensor that is configured to sense movement and rotation of a main body of the terminal while the voice is input.

In accordance with one exemplary embodiment, the controller may control the output unit to adjust a volume of the audible data to correspond to the volume of the input voice.

In accordance with one exemplary embodiment, the controller may execute an operation based on the voice. The controller may control the output unit to output a text corresponding to the audible data while the output of the audible data is restricted.

In accordance with one exemplary embodiment, the controller may control the output unit to output a notification sound indicating that the operation has been executed when the output of the audible data is restricted.

In accordance with one exemplary embodiment, the output unit may include a display unit that is configured to output the visible data, and a speaker that is configured to output the audible data. The controller may control the display unit to output a text corresponding to the voice and the visible data in a sequential manner.

In accordance with one exemplary embodiment, the speaker may be formed adjacent to one end portion of the display unit, and the controller may control the display unit to sequentially output the visible data and the text in a direction of getting away from the one end portion when the output of the audible data is restricted.

In accordance with one exemplary embodiment, the controller may control the display unit to output the more recently output visible data on the time basis and the text on an adjacent area to the microphone.

In accordance with one exemplary embodiment, the controller may control the display unit to output the visible data, which is output on the time basis, and the text in a manner of getting farther away from the microphone.

To achieve these and other advantages and in accordance with the purpose of this specification, as embodied and broadly described herein, there is provided a control method of a terminal including receiving a user's voice input through a microphone, analyzing an attribute of the received voice, sensing a degree of proximity between the user's mouth and the microphone while the voice is input, generating visible data and audible data based on the voice, and restricting an output of the audible data when the degree of proximity is smaller than a preset range and a volume of the voice is below a preset reference volume while the voice is input.

In accordance with one exemplary embodiment, the analyzing of the attribute of the voice may include determining whether or not the voice is sorted as whispering including a rustling sound.

In accordance with one exemplary embodiment, the method may further include outputting a text corresponding to the audible data when the output of the audible data is restricted.

In accordance with one exemplary embodiment, the method may further include outputting a notification sound indicating an execution of the operation when the output of the audible data is restricted.

In accordance with one exemplary embodiment, the text and the visible data may be sequentially output on a display unit in a direction getting away from an area adjacent to the microphone.

In accordance with the present disclosure, user's state and intention may be recognized based on an attribute of a user's voice in a voice recognition mode, and an output of audible data may be restricted without a separate control command input by the user.

Also, when the output of the audible data is restricted, an execution of an operation may be notified by use of a text, a notification sound and the like, which may allow the user to recognize the operation more conveniently.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 5A is a conceptual view illustrating the control method of FIG. 4;

FIGS. 6A to 6D are conceptual views illustrating a method of controlling an output of audible data in accordance with various exemplary embodiments;

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A mobile terminal disclosed herein may include a portable phone, a smart phone, a laptop computer, a digital broadcast terminal, a personal digital assistant (PDA), a portable multimedia player (PMP), a navigator, a slate PC, a tablet PC, an ultrabook, and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
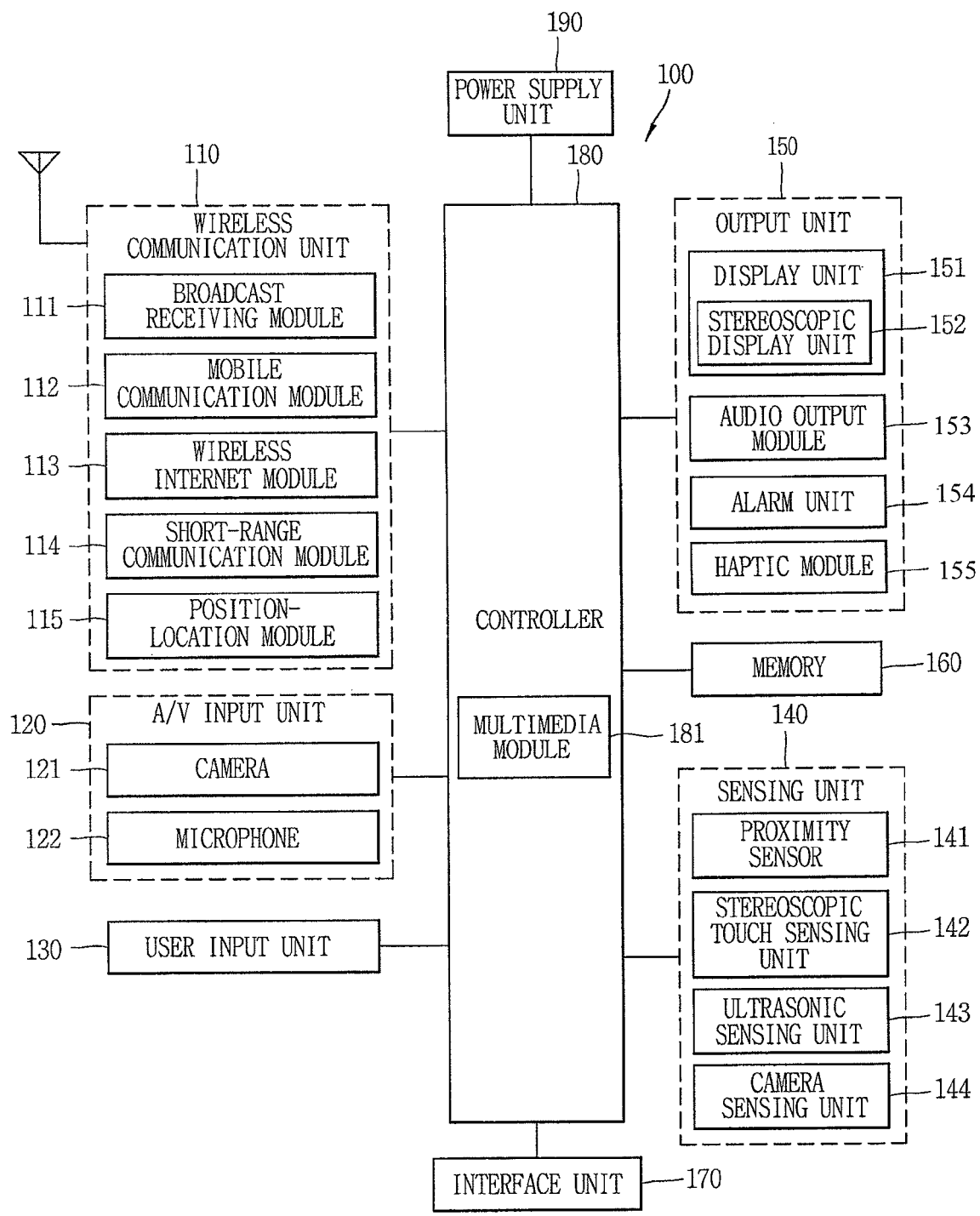
FIG. 1 is a block diagram of a mobile terminal in accordance with one exemplary embodiment.

FIG. 1 is a block diagram illustrating a mobile terminal 100 associated with an exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the A/V input unit 120 may be configured to provide an audio or video signal input to the mobile terminal. The A/V input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the mobile terminal 100. The audio output module 153 may include a receiver, a speaker, a buzzer or the like.

The alarm unit 154 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects the that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
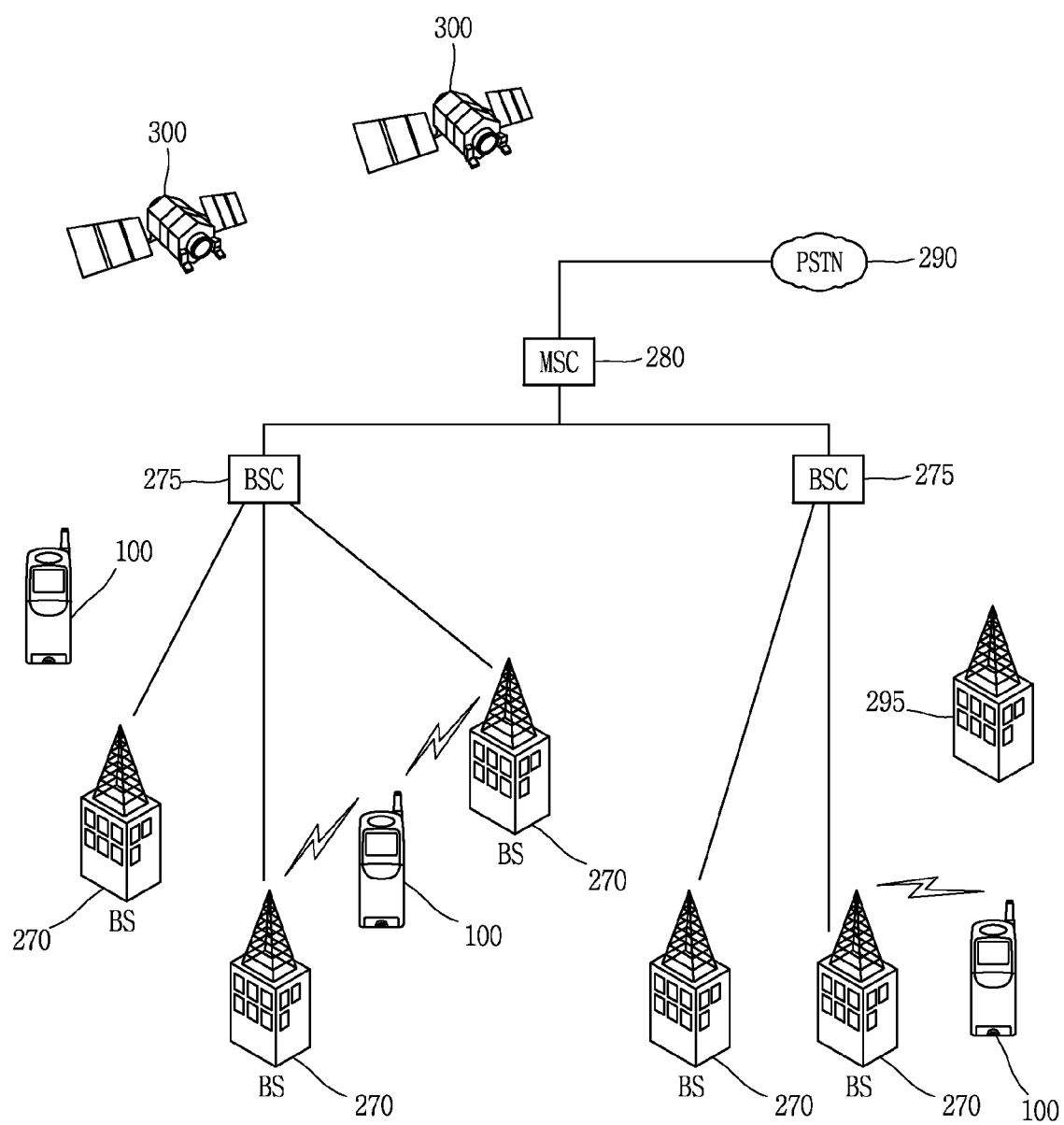
FIGS. 2A and 2B are conceptual views of a communication system operable with the mobile terminal.
Figure 2B:
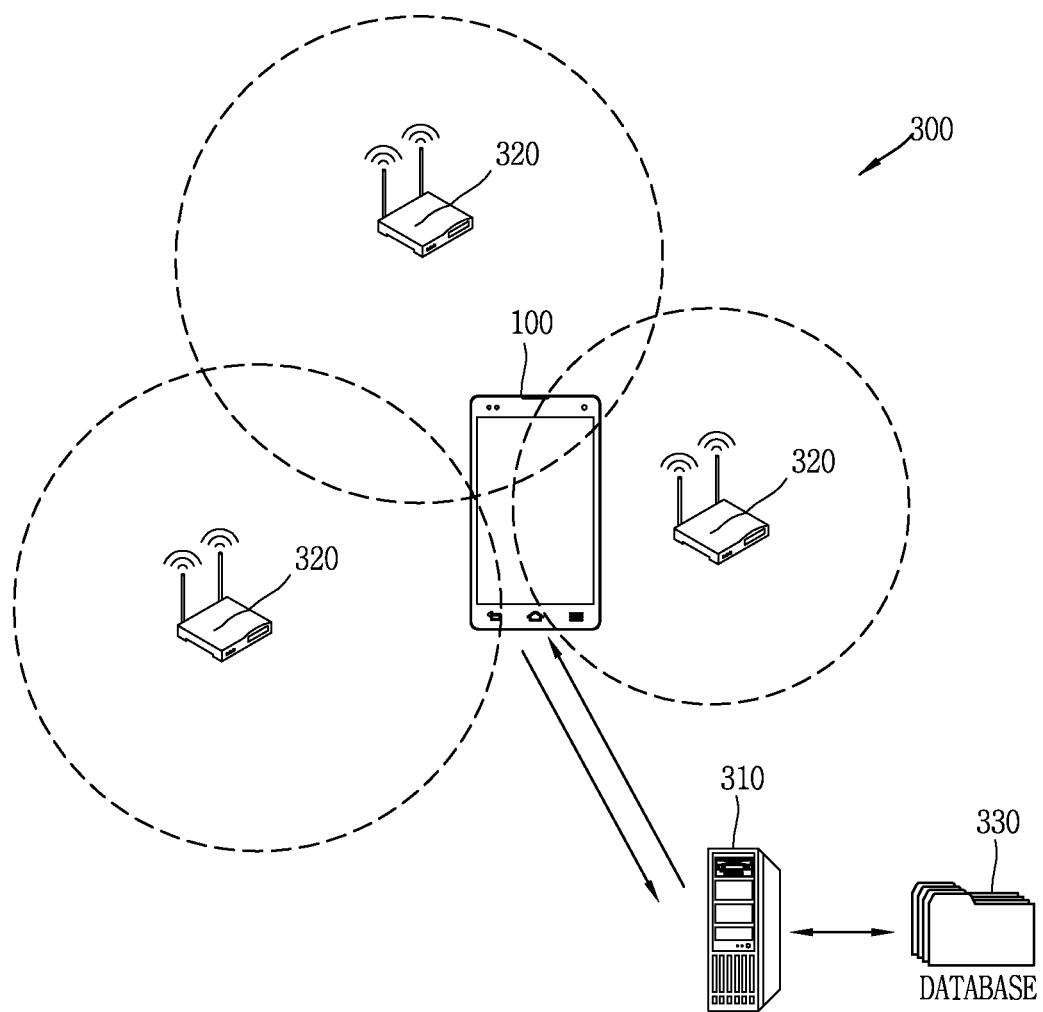

Hereinafter, a communication system which is operable with the mobile terminal 100 according to the present disclosure will be described. FIGS. 2A and 2B are conceptual views of a communication system operable with a mobile terminal 100 in accordance with the present disclosure.

First, referring to FIG. 2A, such communication systems may utilize different air interfaces and/or physical layers. Examples of such air interfaces utilized by the communication systems may include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings may be applied equally to other system types including the CDMA wireless communication system.

Referring now to FIG. 2A, a CDMA wireless communication system is shown having a plurality of mobile terminals 100, a plurality of base stations (BSs) 270, a plurality of base station controllers (BSCs) 275, and a mobile switching center (MSC) 280. The MSC 280 may be configured to interface with a conventional Public Switch Telephone Network (PSTN) 290. The MSC 280 may also be configured to interface with the BSCs 275. The BSCs 275 may be coupled to the BSs 270 as a pair via backhaul lines. The backhaul lines may be configured in accordance with at least one of several known interfaces including, for example, E1/T1, ATM, IP, PPP, Frame Relay, HDSL, ADSL, or xDSL. Hence, the plurality of BSCs 275 may be included in the system as illustrated in FIG. 2A.

Each BS 270 may include one or more sectors, each sector having an omni-directional antenna or an antenna pointed in a particular direction radially away from the BS 270. Alternatively, each sector may include two or more different antennas. Each BS 270 may be configured to support a plurality of frequency assignments, with each frequency assignment having a particular spectrum (for example, 1.25 MHz, 5 MHz, etc.).

The intersection of sector and frequency assignment may be referred to as a CDMA channel. The BSs 270 may also be referred to as Base Station Transceiver Subsystems (BTSs). In some cases, the term "base station" may be used to refer collectively to one BSC 275 and at least one base station 270. The base stations may also be denoted as "cell sites." Alternatively, individual sectors of a given BS 270 may be referred to as cell sites.

A broadcasting transmitter (BT) 295, as illustrated in FIG. 2A, may transmit a broadcast signal to the mobile terminals 100 operating within the system. The broadcast receiving module 111 illustrated in FIG. 1 may be typically configured inside the mobile terminal 100 to receive broadcast signals transmitted by the BT 295.

FIG. 2A further depicts several Global Positioning System (GPS) satellites 300. Such satellites 300 may facilitate locating the position of at least one of plural mobile terminals 100. Two satellites are depicted in FIG. 2, but it may be understood that useful position information may be obtained with greater or fewer satellites than two satellites. The GPS module 115 illustrated in FIG. 1 may be typically configured to cooperate with the satellites 300 to obtain desired position information. It may be appreciated that other types of position detection technologies, in addition to or instead of GPS location technology, may alternatively be implemented. If desired, at least one of the GPS satellites 300 may alternatively or additionally be configured to provide satellite DMB transmissions.

During typical operation of the wireless communication system, the BSs 270 may receive sets of reverse-link signals from various mobile terminals 100. The mobile terminals 100 may be engaging in calls, messaging, and executing other communications. Each reverse-link signal received by a given BS 270 may be processed within that BS 270. The resulting data may be forwarded to a connected BSC 275. The BSC 275 may provide call resource allocation and mobility management functionality including the orchestration of soft handoffs between BSs 270. The BSCs 275 may also route the received data to the MSC 280, which may then provide additional routing services for interfacing with the PSTN 290. Similarly, the PSTN 290 may interface with the MSC 280, and the MSC 280 may interface with the BSCs 275, which may in turn control the BSs 270 to transmit sets of forward-link signals to the mobile terminals 100.

Hereinafter, description will be given of a method for acquiring location information of a mobile terminal using a Wireless Fidelity (WiFi) Positioning System (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 may extract the information of the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 2B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as MAC address, SSID, RSSI, channel information, privacy, network type, latitude and longitude coordinates of the wireless AP, building at which the wireless AP is located, floor number, detailed indoor location information (GPS coordinates available), AP owner's address, phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched to the retrieved wireless AP, thereby extracting the location information of the mobile terminal 100.

Figure 3A:
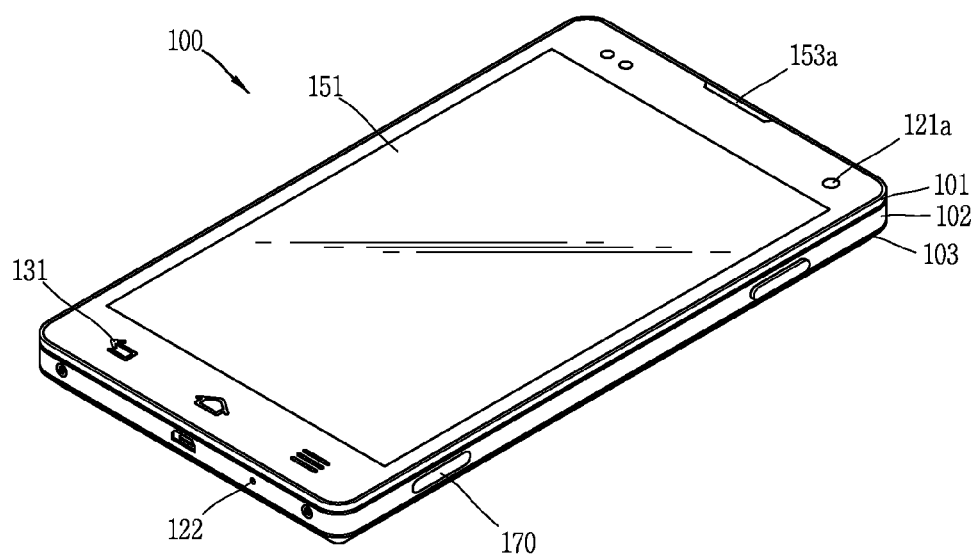
FIG. 3A is a front perspective view of a mobile terminal in accordance with one exemplary embodiment.

FIG. 3A is a front perspective view illustrating an example of a mobile terminal 100 associated with the present disclosure.

The mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

The body may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102, and a battery cover 103 for covering a battery 191 may be detachably configured at the rear case 102. A battery cover 103 covering a battery 191 may be detachably coupled to the rear case 102.

The cases may be formed by injection-molding synthetic resin or may be formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may visually output information by including at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may include a touch sensing element to receive a control command by a touch method. When a touch is made to any one place on the display unit 151, the touch sensing element may be configured to sense this touch and enter the content corresponding to the touched place. The content entered by a touch method may be a text or numerical value, or a menu item which can be indicated or designated in various modes.

The touch sensing element may be formed with transparency to allow visual information displayed on the display unit 151 to be seen, and may include a structure for enhancing visibility of a touch screen at bright places. Referring to FIG. 3A, the display unit 151 occupies a most portion of the front surface of the front case 101.

The first audio output unit 153a and the first camera 121a may be disposed in a region adjacent to one of both ends of the display unit 151, and the first manipulation input unit 131 and the microphone 122 may be disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present disclosure may not be limited to this, but a hole for releasing the sounds may be formed on a window.

The first camera 121a may process video frames such as still or moving images obtained by the image sensor in a video call mode or a capture mode. The processed video frames may be displayed on the display unit 151.

The user input unit 130 may be manipulated by a user to input a command for controlling the operation of the mobile terminal 100. The user input unit 130 may include first and second manipulation units 131 and 132. The first and the second manipulation units 131 and 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a push key.

The content received by the first and/or second manipulation units 131 and 132 may be set in various ways. For example, the first manipulation unit 131 may be used by the user to input a command such as menu, home key, cancel, search, or the like, and the second manipulation unit 132 may be used by the user to input a command, such as controlling a volume level being output from the first audio output module 153a, switching into a touch recognition mode of the display unit 151, or the like.

The microphone 122 may be formed to receive the user's voice, other sounds, and the like. The microphone 122 may be provided at a plurality of places, and configured to receive stereo sounds.

The interface unit 170 may serve as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

Figure 3B:
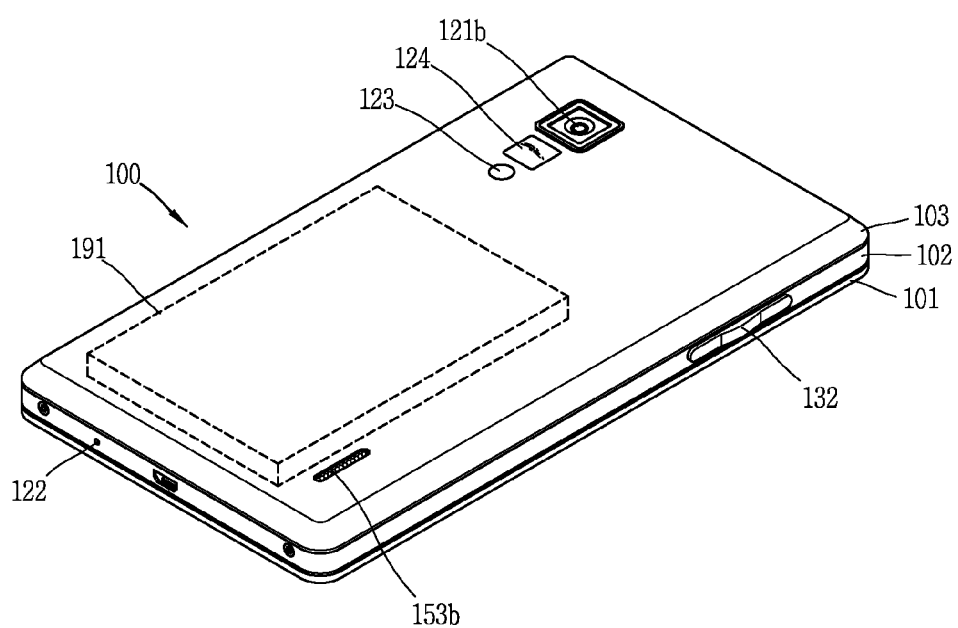
FIG. 3B is a rear perspective view of the mobile terminal illustrated in FIG. 3A.

FIG. 3B is a rear perspective view of the mobile terminal 100 illustrated in FIG. 3A.

Referring to FIG. 3B, a second camera 121b may be further mounted at a rear surface of the terminal body, namely, the rear case 102. The second camera 121b may have an image capturing direction, which is substantially opposite to the direction of the first camera unit 121a (refer to FIG. 3A), and have a different number of pixels from that of the first camera unit 121a.

For example, it may be preferable that the first camera 121a has a smaller number of pixels to capture an image of the user's face and transmits such image to another party, and the camera 221' has a larger number of pixels to capture an image of a general object and not immediately transmits it in most cases. The first and the second cameras 121a and 121b may be installed on the terminal body such that they can be rotatable or popped up.

Furthermore, a flash 123 and a mirror 124 may be additionally disposed adjacent to the second camera 121b. When an image of a subject is captured with the camera 121b, the flash 123 may illuminate the subject. The mirror 124 may allow the user to see himself or herself when he or she wants to capture his or her own image (i.e., self-image capturing) by using the camera 121b.

A second audio output unit 153b may be further disposed on the rear surface of the terminal body. The second audio output module 153b may implement stereophonic sound functions in conjunction with the first audio output module 153a (refer to FIG. 3A), and may be also used for implementing a speaker phone mode for call communication.

An antenna (not shown) for receiving broadcast signals may be additionally disposed on a lateral surface of the terminal body in addition to an antenna for making a phone call or the like. The antenna constituting a part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Figure 4:
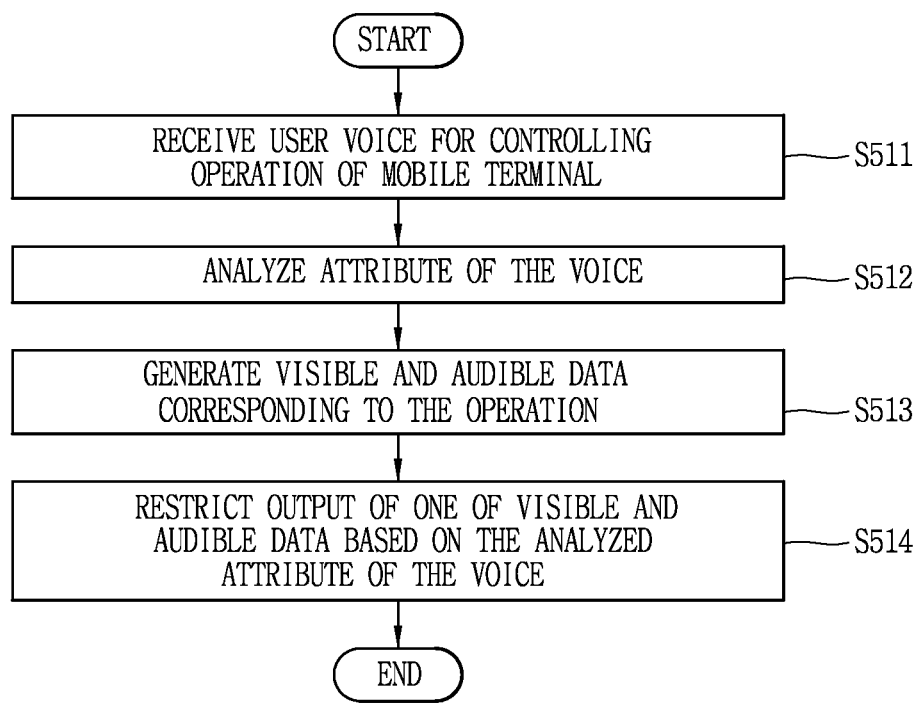
FIG. 4 is a flowchart illustrating a control method of a mobile terminal in accordance with one exemplary embodiment.

FIG. 4 is a flowchart illustrating a control method of a mobile terminal in accordance with one exemplary embodiment, and FIG. 5A is a conceptual view illustrating the control method of FIG. 4.

A control method of restricting an output of audible data based on an analyzed user voice will be described with reference to FIGS. 4 and 5A, The microphone 122 may receive a voice, which is input for controlling at least one operation of the mobile terminal. The controller 180 may analyze the voice input through the microphone 122 using a natural language analysis, and control an operation of the mobile terminal corresponding to the analyzed voice. There may not be a limit to the operation controlled based on the voice.

For example, the operation may correspond to an output of information stored in the mobile terminal, execution and control of an application, a storage of information, a transmission of a message, a communication with an external terminal, and the like. A type of the operation may not be limited.

Although not shown, the controller 180 may activate a program of recognizing the voice based on a control command applied to the mobile terminal. For example, the controller 180 may execute the voice recognition program in response to a control command or a touch input applied to a signal input unit of the mobile terminal.

Referring to FIG. 5A, the controller 180 may control the display unit 151 to output an execution screen 501 when the voice recognition program is executed. The execution screen 501 may include a text for asking a user-desired function (for example, May I help you?). As soon as the program is executed, the controller 180 may activate the microphone 122 to receive a user's voice 610.

The controller 180 may analyze the meaning of the user's voice 610, and control the mobile terminal to execute an operation according to the voice 610. Also, the controller 180 may generate visible and audible data based on the voice 610

Figure 5B:
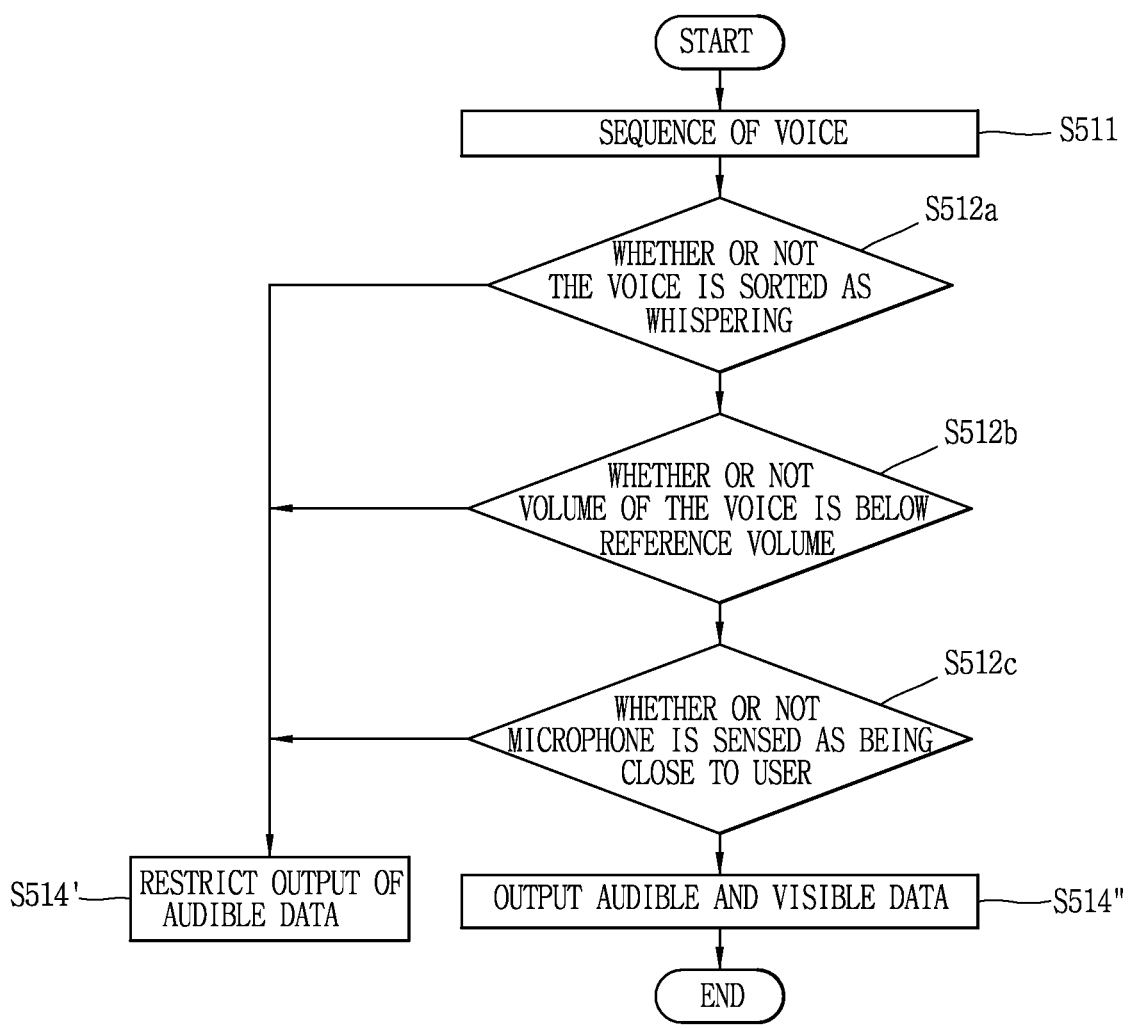
FIG. 5B is a flowchart illustrating a method of analyzing an attribute of a voice in accordance with one exemplary embodiment.

(S513). Referring to FIGS. 5A-A and 5A-B, the controller 180 may execute a function for providing information related to today's weather, in response to a voice "What's the weather like today?" and then generate data to be provided to the user among the information.

Also, the controller 180 may control the display unit 151 and the audio output module 153 to output visible data 510 and audible data 601 related to the information, respectively. Here, the visible data 510 may correspond to at least part of information included in a weather application. That is, the controller 180 may generate the visible data 510 by extracting the information stored in the weather application based on the voice. For example, the visible data 510 may include text information, images and the like, relating to the current temperature, weather, and time.

The audible data 601 may correspond to a sound signal generated by converting at least part of the visible data into a voice. For example, the controller 180 may generate the audible data 601 by converting information corresponding to the user's voice among the text of the visible data 510.

Here, the controller 180 may control the output unit to restrict (limit) an output of at least one of the visible data and the audible data based on the voice (S514). The mobile terminal may further include an analyzing unit which analyzes an attribute of a voice input through the microphone 122. The analyzing unit may analyze the attribute of the voice based on various criteria.

FIG. 5B is a flowchart illustrating a method of analyzing an attribute of a voice in accordance with one exemplary embodiment. Hereinafter, description will be given of a method of controlling an output of audible data according to an attribute of a voice with reference to FIGS. 5A and 5B.

Referring to FIG. 5B, the controller 180 may control the microphone 122 to receive the voice (S511). The controller 180 may control the analyzing unit to analyze the received voice. The analyzing unit may analyze an attribute that the voice is output, not the meaning of the voice. The analyzing unit may determine whether or not the voice is sorted as whispering (S512a).

Here, the whispering, which is spoken by a person, may correspond to a low voice including rustling sounds, and the like. In general, a user transfers a voice in form of whispering when the user talks to a person close to him/her. The controller 180 may sort the voice as whispering based on rustling sounds included in the voice, a tone of the voice, and the like.

The analyzing unit may analyze nuance, speed, strength and degree of echo of the input voice, and classify the voice as the whispering based on the analysis result.

Although not shown, the controller 180 may control the memory 160 to store the voice input through the microphone 122, and sort the user-input voice according to an attribute. The controller 180 may analyze the attribute of the input voice using voices stored in the memory 160 in the sorting manner.

In this manner, the voice of each user which has a different pitch of voice may be analyzed more accurately. That is, it may be allowed to more accurately recognize a user's intention based on the user's various voices stored, and control whether or not to output audible data according to the recognized user's intention.

When the input user's voice is sorted as the whispering by the analyzing unit, the controller 180 may control the audio output module 153 to restrict the output of the audible data (S514').

Referring to FIG. 5A-B, the controller 180 may control the display unit 151 to output visible data 510 which corresponds to the voice 610. For example, the visible data 510 may be implemented as a text or image including weather information. This may allow the user to be provided with only information displayed on the display unit 151.

In accordance with the one exemplary embodiment of the present disclosure, the controller 180 may control the audio output module 153 to output the audible data when the voice is not sorted as the whispering.

On the other hand, when the voice is not sorted as the whispering, the controller 180 may control the analyzing unit to compare a volume of the voice and a reference volume. That is, the analyzing unit may determine whether or not the volume of the voice is below the reference volume (S152b).

Here, the reference volume may be defined by a user's setting, but the present disclosure may not be limited to this. For example, when a voice control command is input through the microphone 122, the controller 180 may store information related to the volume of the voice, and set the reference volume. For example, the reference volume may be an average volume of stored voices.

The controller 180 may control the audio output module 153 to restrict the output of the audible data when the volume is below the reference volume. For example, the case where the volume of the voice is below the reference volume may be a case where the mobile terminal and the user are relatively far away from each other, and a case where the user inputs his/her voice in relatively weak sound.

That is, even though the user's voice is not sorted as the whispering, when the voice is weak in sound, the output of the audible data may be restricted. This may prevent data from being transferred even to another user when the user and the mobile terminal are far away from each other. Also, when the user inputs the voice in weak sound, it may be predicted that the user is present in a relatively quiet place where the user has to talk in low sound. In this case, the audible data may be automatically prevented from being output in such quiet place.

The controller 180 may restrict the output of the audible data when the volume is below the reference volume (S514'). Also, when the volume is over the reference volume, the controller 180 may control the audio output module 153 and the display unit 151 to output the audible and visible data.

On the other hand, when the volume is over the reference volume, the controller 180 may control the sensing unit to sense a distance between the microphone 122 and the user. That is, the controller 180 may determine whether or not the microphone 122 and the user are sensed close to each other (S152c).

For example, the sensing unit may include a proximity sensor which is mounted adjacent to the microphone 122. The controller 180 may activate the proximity sensor to sense a user's mouth and the like, which is adjacent to the microphone 122, while the voice is input through the microphone 122.

When the microphone 122 is sensed to be located close to the user, the controller 180 may control the audio output module 153 to restrict the output of the audible data (S514'). Also, when the user is not sensed adjacent to the microphone 122, the controller 180 may control the output unit to output the audible data and the visible data (S514").

That is, the user's intention may be recognized more accurately by way of sensing the relative positions of the user and the mobile terminal as well as the attribute of the voice.

Referring to FIG. 5A-C, the controller 180 may control the audio output module 153 to output audible data 601 which include information corresponding to the voice 610. The audible data 601 may include at least part of information included in the visible data 510.

Accordingly, even when the user's voice is sorted as the whispering or the volume of the voice is received louder than the reference volume, if it is sensed that the user's mouth is located close to the microphone 122, the output of the audible data may be restricted.

That is, when the user consciously puts the mobile terminal close to the mouth to input the voice and when the mobile terminal and the user are closely located due to a surrounding environment, the output of the audible data may be restricted. For example, when the user inputs the voice by putting the mobile terminal close to the mouth so as not to be heard by others, the audible data may not be exposed to the outside as well.

The present disclosure may be configured to control an output of audible data by determining whether or not a user does not want to expose audible data. Hereinafter, a control method of outputting audible data according to various exemplary embodiments will be described.

FIGS. 6A to 6D are conceptual views illustrating a method of controlling an output of audible data in accordance with various exemplary embodiments.

Hereinafter, description will be given of a control method of restricting an output of audible data in response to a movement of a mobile terminal sensed by the sensing unit, with reference to FIG. 6A. In accordance with this exemplary embodiment, the controller 180 may activate the sensing unit 140 when a voice recognition mode is activated or a voice is input through the microphone 122.

As aforementioned, the sensing unit 140 may include the proximity sensor adjacent to the microphone 122.

On the other hand, the sensing unit 140 may include a gyro sensor which senses a rotation of a main body of the mobile terminal. The controller 180 may control the audio output module 153 to restrict the output of the audible data when the gyro sensor senses the rotation of the mobile terminal while the voice is input. A time point when the rotation of the mobile terminal is sensed by the gyro sensor may not be limited.

For example, when the voice recognition mode is activated and the rotation of the mobile terminal is sensed prior to the voice being input, when the rotation is sensed while the voice is input, or when the rotation is sensed while audible data corresponding to the input voice is output, the controller 180 may restrict the output of the audible data.

FIG. 6A illustrates the control method employed to a case where the voice is input after the voice recognition mode is activated and the rotation of the mobile terminal is sensed. The controller 180 may control the output unit 150 to output visible data with restricting the output of audible data.

However, the present disclosure may not be limited to this. The controller 180 may also control the audio output module 153 by determining an attribute of the input voice as well as the relative position of the user with respect to the mobile terminal sensed by the sensing unit and the rotation of the mobile terminal.

Hereinafter, description will be given of a method of controlling an output of data according to an external sound input along with a voice with reference to FIG. 6B.

The controller 180 may activate the microphone 122 in the voice recognition mode such that a user's voice 610 can be received through the microphone 122. Here, it may be allowed that both the voice 610 and the external sound 620 are input through the activated microphone 122.

The controller 180 may control the analyzing unit to analyze the voice 610 and the external sound 620. The analyzing unit may analyze each attribute of the voice 610 and the external sound 620 in a sorting manner.

The controller 180 may control the analyzing unit to analyze the attribute of the external sound 620 as well as analyzing the voice 610.

The controller 180 may predict, based on the external sound 620, an external environment where the mobile terminal is located while the voice is input. For example, when the external sound 620 corresponds to a broadcast of guiding a bus stop, the controller 180 may predict that the mobile terminal is located within a bus.

When the predicted external environment corresponds to a preset place, the controller 180 may control the audio output module 153 to restrict the output of the audible data. For example, the preset place may be a public place where many people are present. Although not shown in detail, the controller 180 may control the memory 160 to store the external sound.

However, the present disclosure may not be limited to this. The analyzing unit may analyze both the voice and the external sound. For example, the analyzing unit may determine a relative volume of the voice with respect to the external sound. When a difference between the volume of the voice and a volume of the external sound is lower than a preset reference volume, the controller 180 may control the audio output module 153 to restrict the output of the audible data.

That is, the controller 180 may restrict the output of the audible data according to the user's current surrounding environments as well as the user's intention by use of the external sound which is input along with the user's voice through the microphone 122.

Hereinafter, a control method of outputting audible data based on a volume of an input voice will be described with reference to FIG. 6C.

The controller 180 may generate data based on a first input voice 610 in the voice recognition mode. The controller 180 may control the analyzing unit to analyze a first attribute of the first voice 610, and control the audio output module 153 to restrict the output of audible data based on the analyzed first attribute of the first voice 610. The controller 180 may control the display unit 151 to output visible data.

Figure 6B:
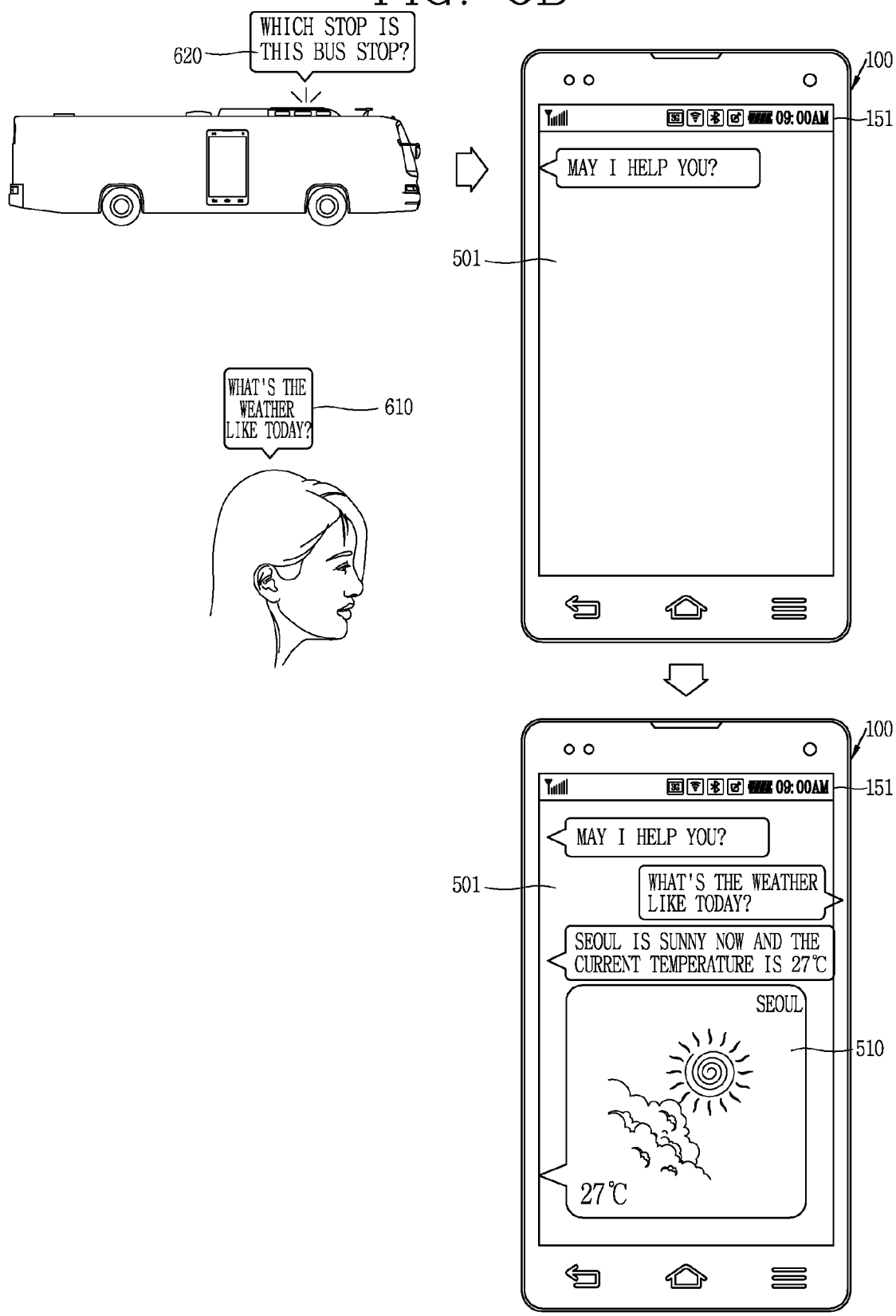
Figure 6C:
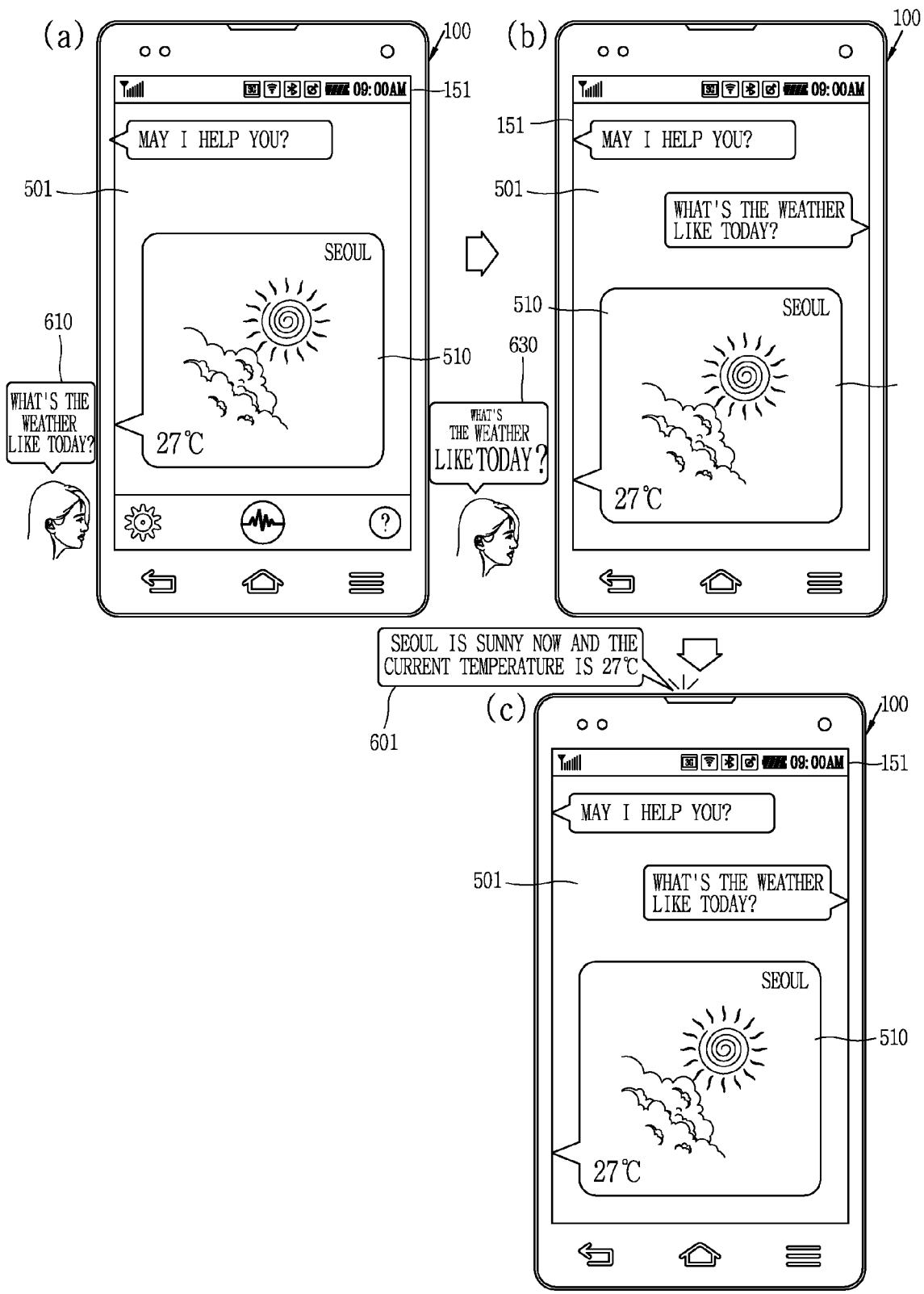

FIG. 6C-B illustrates a state that the visible data corresponding to the first voice 610 is output and the output of the audible data is restricted. For example, the controller 180 may generate the visible data and the audible data based on the first voice 610 which is input in a lower volume than a preset volume, and control the output unit 150 to output only the visible data with restricting the output of the audible data. Referring to FIG. 6C-C, the controller 180 may control the microphone 122 to receive a second voice 630.

The second voice 630 may be defined as including substantially the same content as the first voice 610. That is, the visible and audible data which are generated based on the first and second voices 610 and 630 may be substantially the same as each other.

Here, the second voice 630 may include a second attribute which is different from the first attribute. For example, the second voice 630 may be different from the first voice 610 in at least one of an output form, nuance, speed, strength, and degree of echo.

For example, the second voice 630 may be louder than the first voice 610, and the volume of the second voice 630 may correspond to a volume higher than the reference volume. Here, the second attribute different from the first attribute may not be limited to the volume.

When the second voice 630 is input, the controller 180 may control the output unit 150 to output the visible and audible data 510 and 601. When the second voice 630 is input, the controller 180 may also control the display unit 151 to output the visible data 510 in a repetitive manner. However, without being limited to this, the controller 180 may control the output unit 150 to output only the audible data 601 while the visible data 510 is continuously output on the display unit 151.

This may allow the user to control the output of the audible data in such a manner of inputting the voice, without a separate control command for outputting the audible data.

Hereinafter, description will be given of a control method of outputting audible data according to a volume of a voice with reference to FIG. 6D.

Figure 6D:
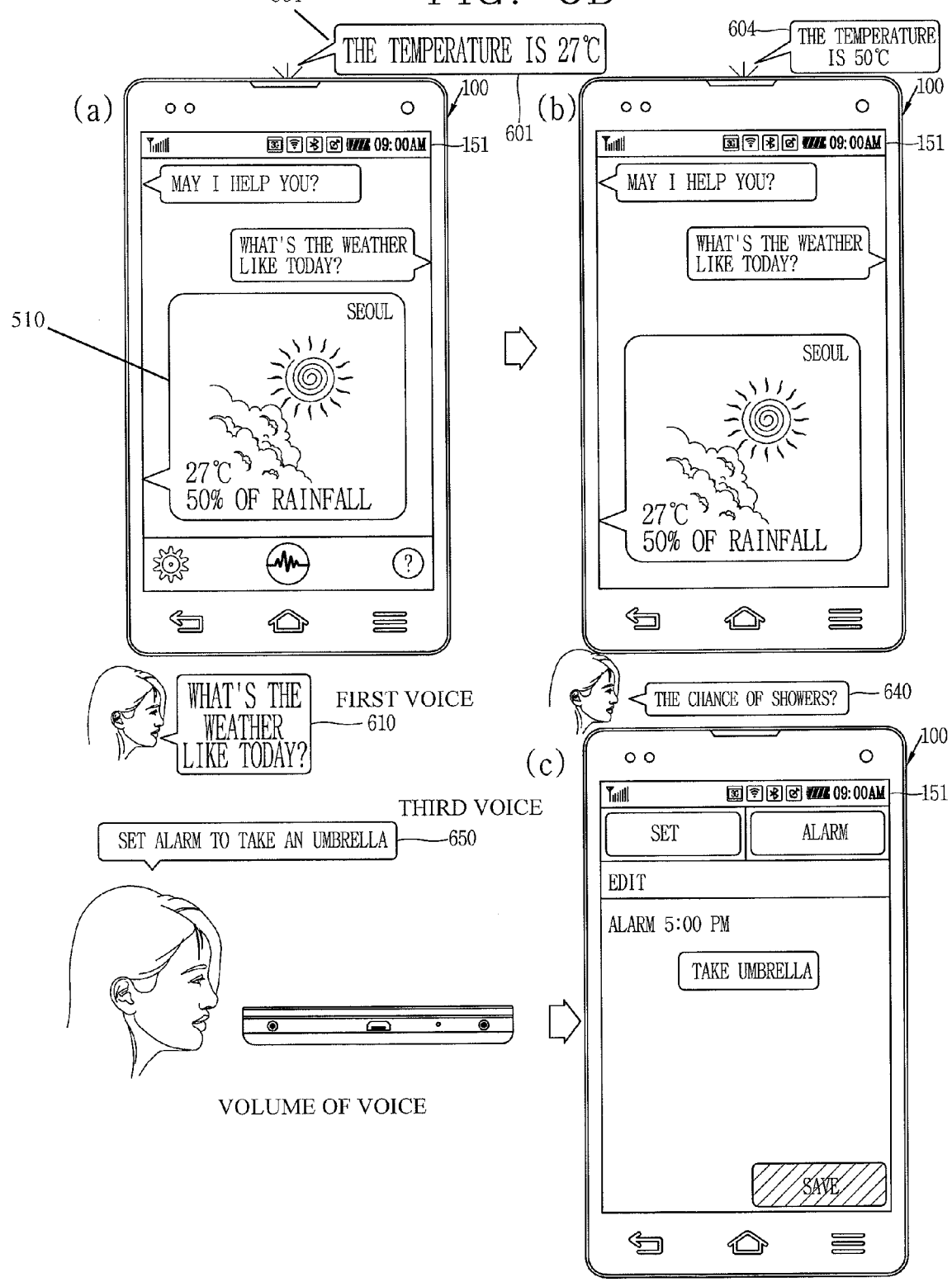

Referring to FIG. 6D-A, the controller 180 may control the output unit 150 to output visible data 510 and first audible data 601 based on a first voice 610 input in a first volume.

The controller 180 may measure the first volume of the first voice 610, and control the audio output module 153 to output the first audible data 601 in the first volume.

On the other hand, the controller 180 may control the audio output module 153 to output second audible data 604 based on a second voice 640 input in a second volume. The controller 180 may control the audio output module 153 to output the second audible data 604 in the second volume.

That is, the controller 180 may control the audio output module 153 to output the audible data in a volume, substantially proportional to the volume of the input voice.

Also, the controller 180 may control the audio output module 153 to restrict the output of the audible data by analyzing the attribute of the input voice and the movement of the mobile terminal.

Referring to FIG. 6D-C, the controller 180 may control the audio output module 153 to restrict the output of the audible data based on the attribute of the voice and proximity or spacing with or from the user.

For example, the controller 180 may control the output unit 150 to restrict the output of the audible data corresponding to a third voice 650, which is input by the user at an adjacent position to the microphone 122, based on at least one of an attribute of the third voice 650 and a relative position of the user sensed by the sensing unit. The controller 180 may control the display unit 151 to output visible data corresponding to the third voice 650.

Consequently, the volume of the audible data may be adjustable by controlling the volume of the input voice. Also, the output of the audible data may be restricted by controlling the volume of the voice.

Figure 7:
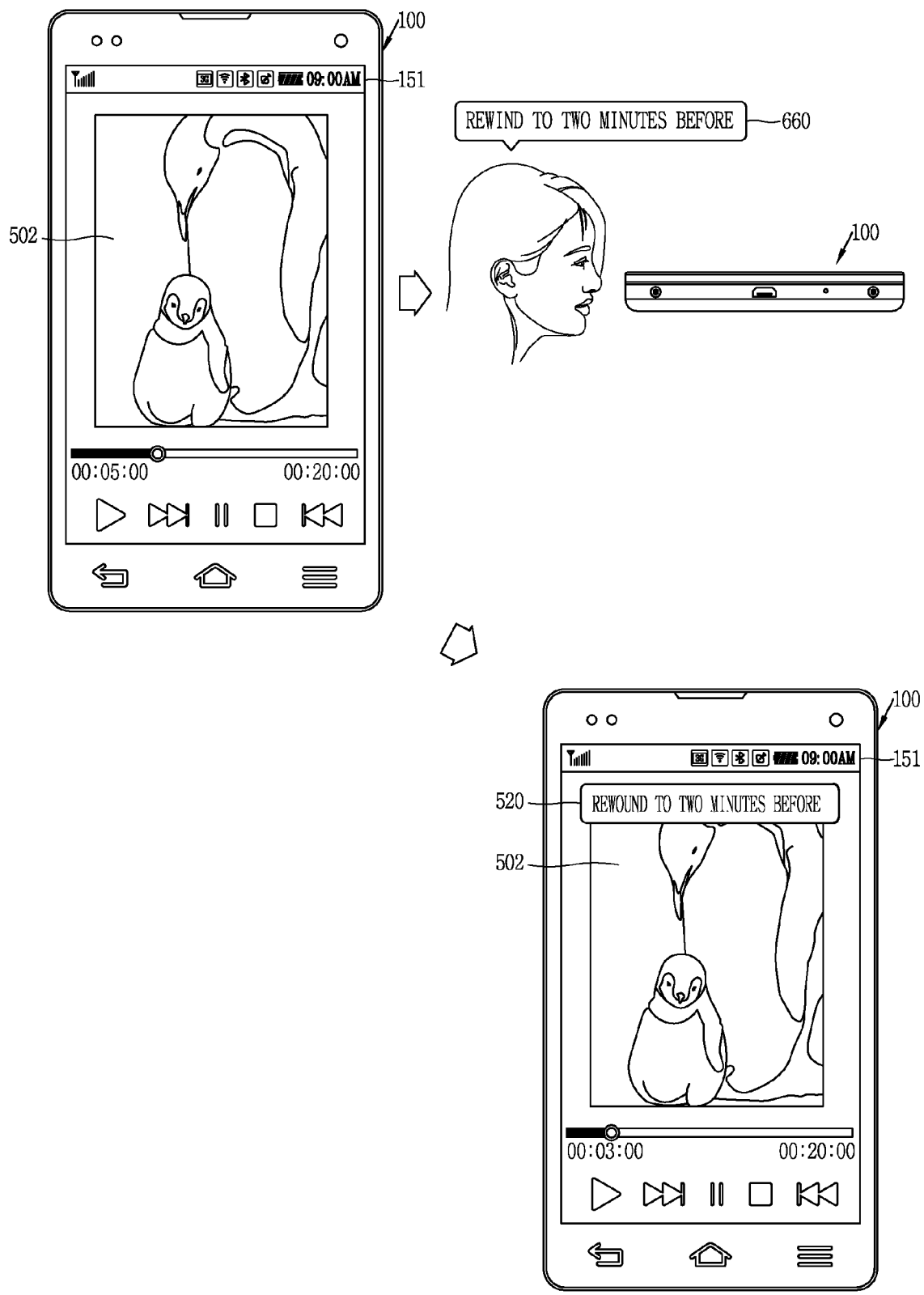
FIG. 7 is a conceptual view illustrating a control method of outputting a blocked (restricted) audible data into a text format.

FIG. 7 is a conceptual view illustrating a control method of outputting a blocked (restricted) audible data into a text format.

As illustrated in FIG. 7, the controller 180 may receive a voice 660 while screen information 502 is output on the display unit 151. For example, the screen information 502 may correspond to a reproduction screen of a video application, and the voice 660 may correspond to a control command for controlling the reproduction.

The controller 180 may control the video reproduction based on the voice 660, and generate visible data and audible data related to the control of the video reproduction. For example, the visible data may correspond to a changed reproduction screen of a video. Also, the controller 180 may control the audio output module 153 to restrict the output of the audible data based on at least one of an attribute of the voice 660 and the movement of the mobile terminal.

In accordance with this exemplary embodiment, the controller 180 may control the display unit 151 to output a text 520 into which the audible data has been converted. For example, the controller 180 may control the display unit 151 to output information (for example, rewind to two minutes before), which is input to control the video reproduction application, into a text format.

This may allow the user to be provided with information, which is to be provided in the format of audible data, in the format of visual information.

Figure 8:
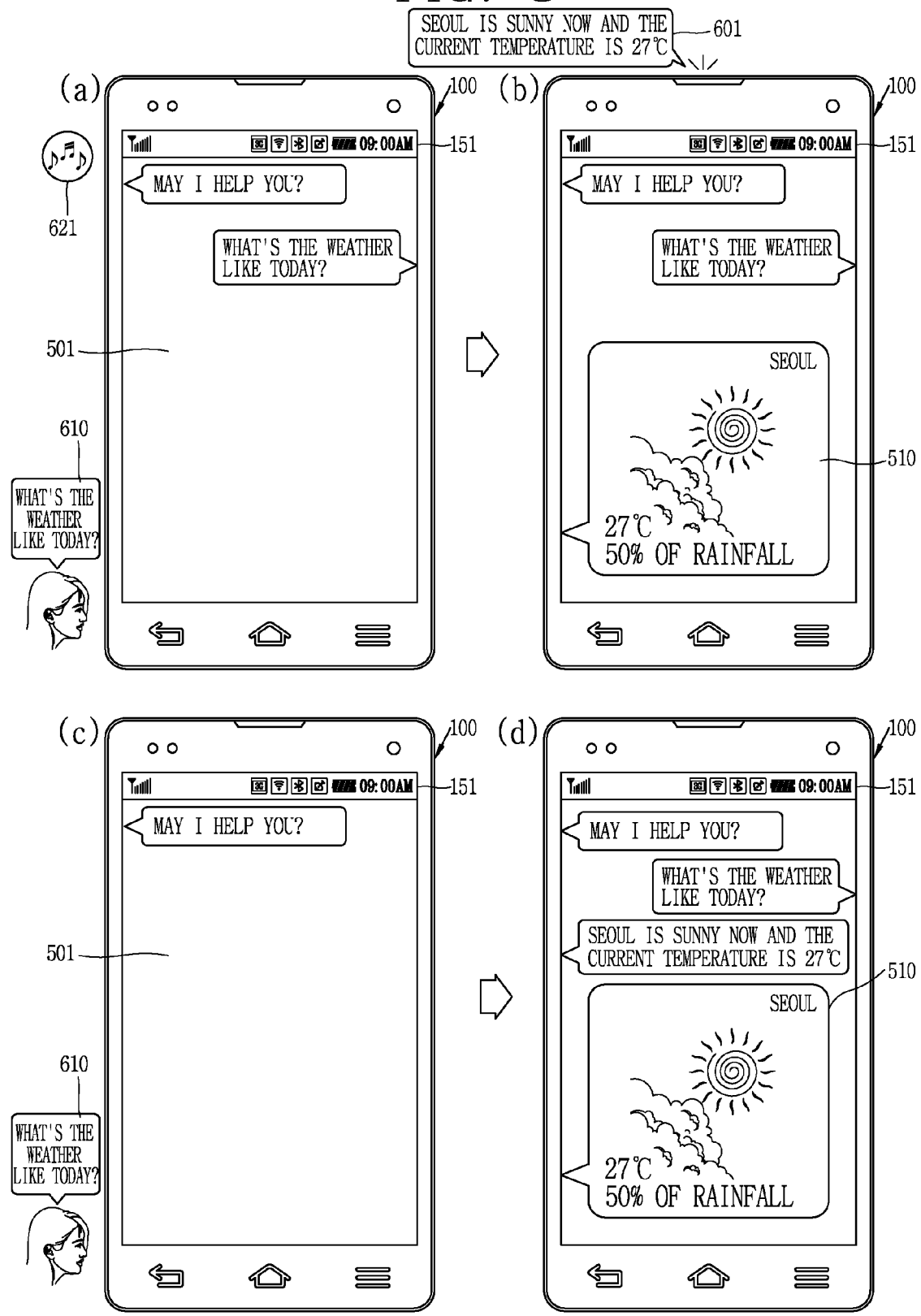
FIG. 8 is a conceptual view illustrating a control method of restricting an output of audible data based on an input external sound in accordance with another exemplary embodiment.

FIG. 8 illustrates a control method of restricting audible data based on an input external sound in accordance with another exemplary embodiment. The controller 180 may control the microphone 122 to receive a user's voice and an external sound of the mobile terminal.

The controller 180 may sort (classify) a voice 610 and an external sound 621, and measure a volume (sound level) of the external sound 621. The controller 180 may compare the external sound 621 with a preset reference volume.

Referring to FIGS. 8A and 8B, when the external sound 621 is louder than the reference volume, the controller 180 may control the audio output module 153 to output audible data 601 generated based on the voice 610. Referring to FIGS. 8C and 8D, when the external sound 621 is lower than the reference volume, then the controller 180 may control the audio output module 153 to restrict the output of the audible data 601.

That is, when the external sound 621 is lower than the reference volume, the controller 180 may determine that the mobile terminal is located in a silent place and accordingly restrict the output of the audible data. For example, the user may automatically restrict the output of the audible data based on the input voice in a silent place, such as a library and the like.

Figure 9A:
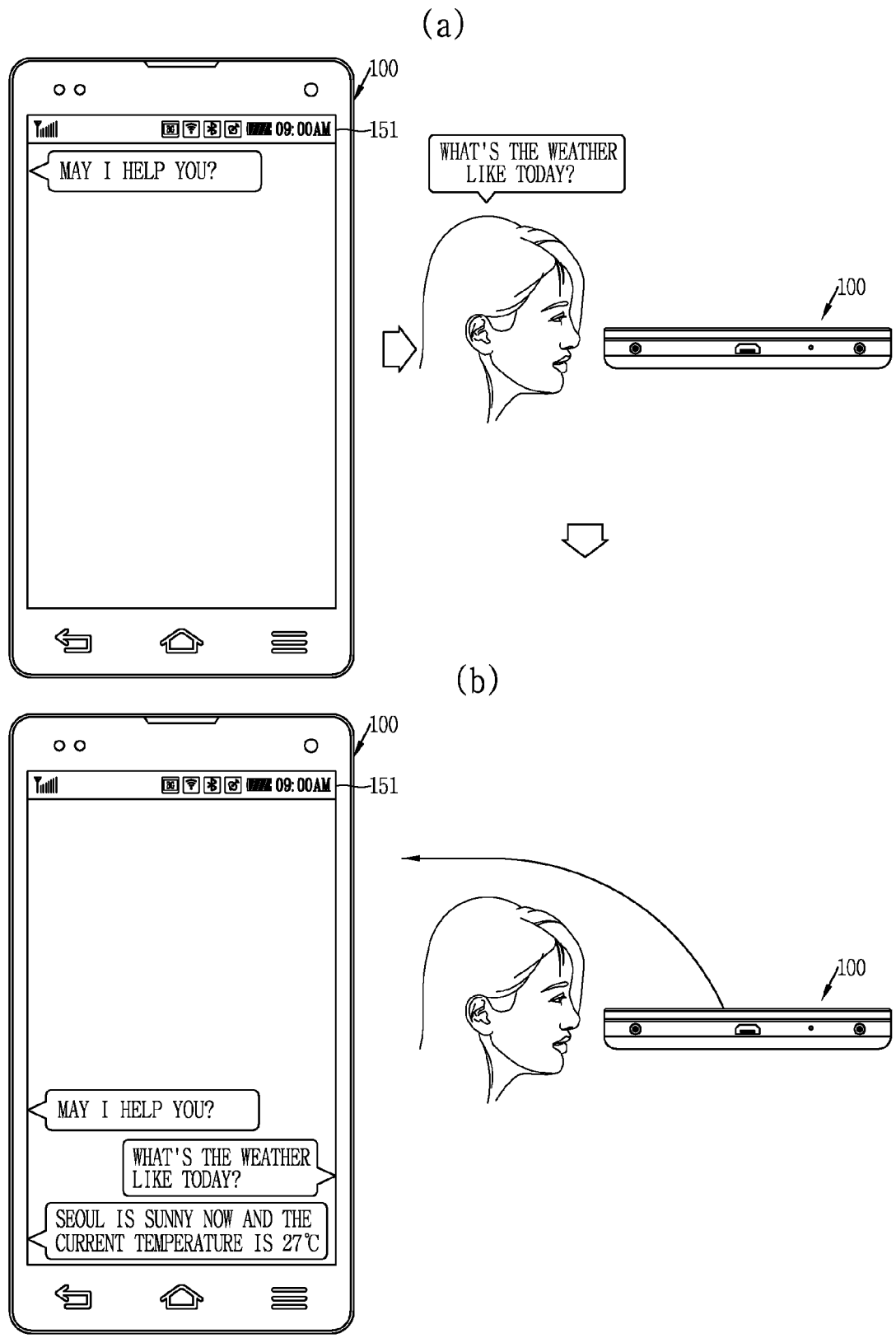
FIGS. 9A and 9B are conceptual views illustrating a control method of outputting audible data and text on a display unit.
Figure 9B:
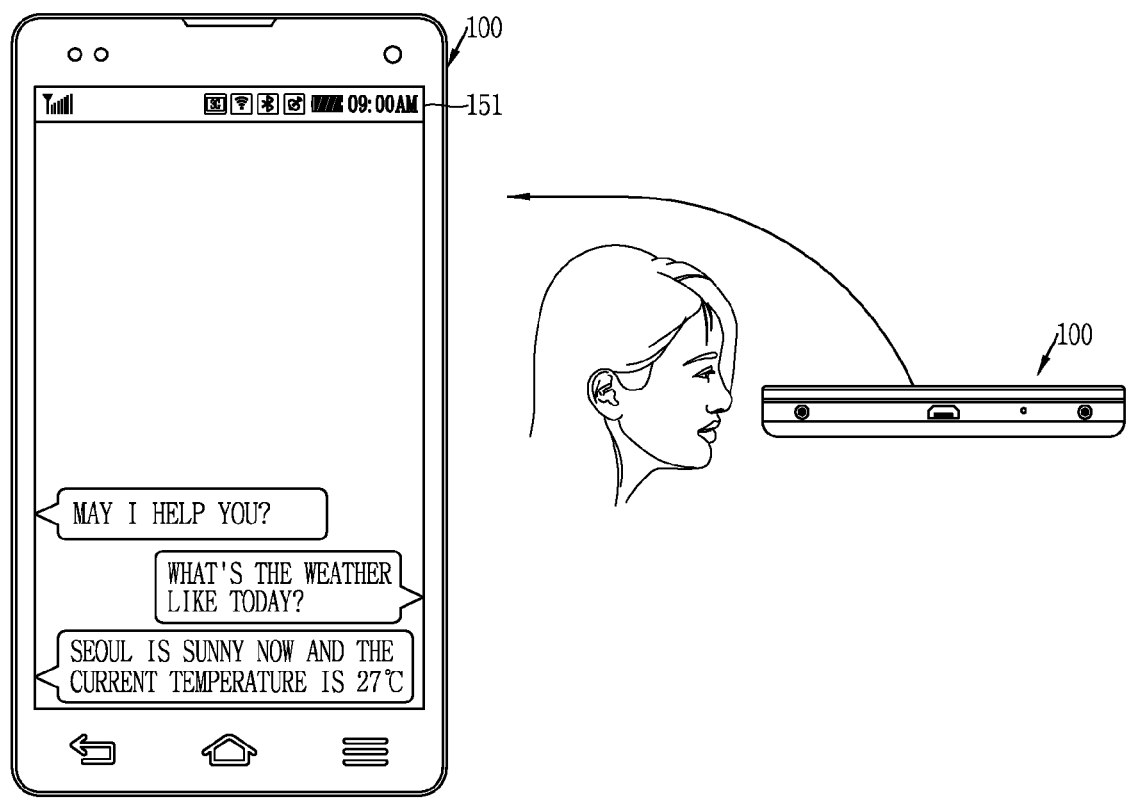

FIGS. 9A and 9B are conceptual views illustrating a control method of outputting visible data and text on a display unit.

As illustrated in FIG. 9A, in a voice recognition mode, the controller may control the display unit to output information (for example, May I help you?), which informs the voice recognition mode. The information may be output on an upper end of the display unit, namely, on one area of the display unit, which is spaced the farthest from the microphone.

The controller may generate audible data and visible data based on the voice. While the voice is recognized, when the microphone 122 and the user's mouth are sensed as being close to each other and the volume of the voice is lower than a preset volume, the controller may control the speaker 153 to restrict the output of the audible data. Also, the controller may control the display unit to output a text corresponding to the voice input through the microphone.

That is, the display unit may output not only the visible data generated based on the voice but also the text corresponding to the voice and the audible data. Accordingly, this may facilitate the user to be aware that the mobile terminal is recognizing the user's voice in the voice recognition mode.

The controller may control the display unit to output at least one of the text corresponding to the audible data and the visible data. In accordance with this exemplary embodiment, the controller may control the display unit to output at least one of the text and the visible data on an area adjacent to the microphone.

For example, the controller may control the display unit to output the most recently generated audible data or the text on the most adjacent area to the microphone. Accordingly, the output position of the most early output information on the display unit may gradually get far away from the microphone.

That is, the terminal may be located close to the user's mouth, and the visible data and the text may be output on an adjacent position to the microphone in the sequential manner.

Referring to FIG. 9B, the controller may control the display unit to output the recently generated visible data or the text on a position away from the microphone. For example, the display unit may output information related to the voice recognition mode on an area of the display unit, which is the closest to the microphone, and output visible data or text generated after the information in a manner of gradually getting away from the microphone.

However, the method of outputting the visible data and the text on the display unit may not be limited to this. For example, image information, video information and the like as well as the text may also be output on the display unit in the same output manner.

Although not shown, the controller may control the display unit to change the orientation of the output visible data and the text according to a direction that the terminal is moved and rotated.

Figure 10A:
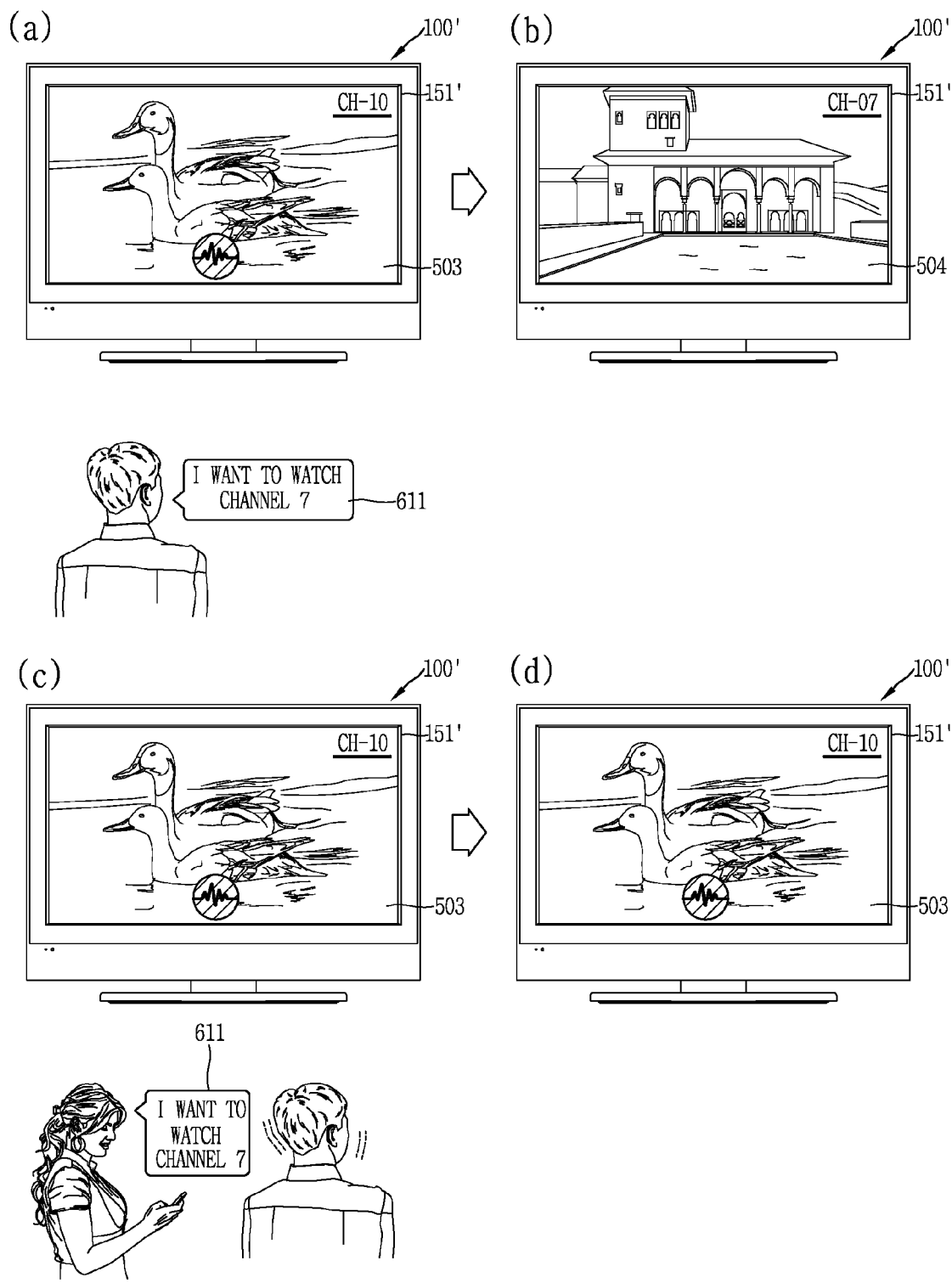
FIGS. 10A and 10B are conceptual views illustrating a method of controlling an output of audible data based on a sensed user in an image display device.
Figure 10B:
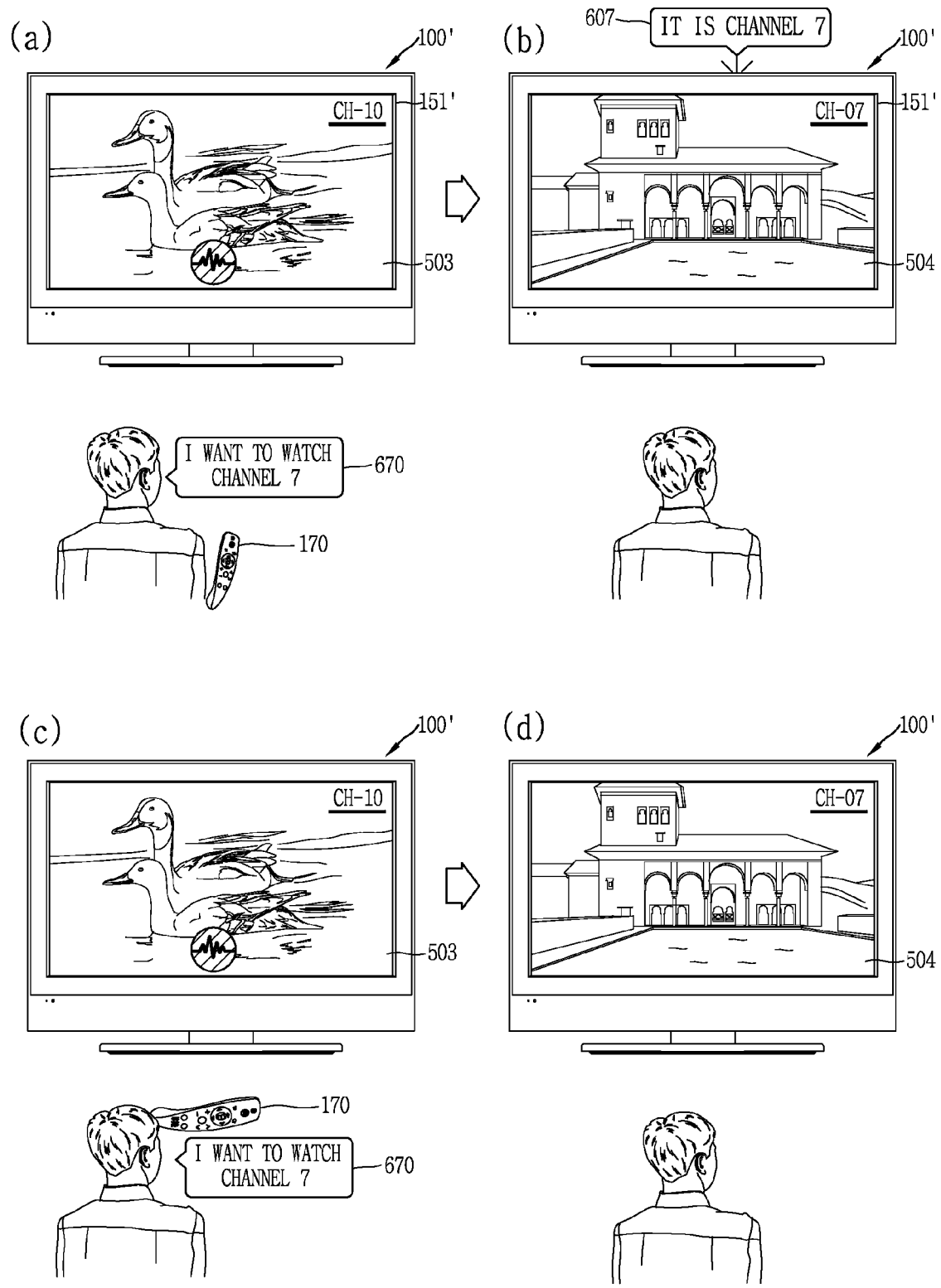

FIGS. 10A and 10B illustrate a method of controlling an output of audible data based on a sensed user in an image display device 100'.

Hereinafter, description will be given of a control method of restricting an output of visible data and audible data by sensing a face of a user who is inputting a voice in an activated state of a voice recognition mode of an image display device, with reference to FIG. 10A. FIGS. 10A-A and 10A-B illustrate that the face of the user who is inputting the voice is recognized as a front face.

The image display device 100' may include a sensing unit which senses a user's face which is located in front of the display unit 151. The sensing unit may be implemented as a camera or the like.

When the user's face sensed by the sensing unit is recognized as a front face, the controller 180 may recognize a user-input voice 611 as a control command for controlling a function of the image display device 100', and control the image display device 100' to execute the function.

Accordingly, the controller 180 may control first screen information 503, which is output on a display unit 151' of the image display device 100', to be converted into second screen information 504. Although not shown, the controller 180 may also control the display unit to output audible data including information indicating that the screen information has been changed based on the voice 611.

On the other hand, when the face of the user inputting the voice 611 is not sensed as the front face, the controller 180 may not recognize the voice 611 as the control command. Accordingly, data associated with the voice 611 may not be generated.

However, a criterion for determining whether or not the voice 611 is a control command may not be limited to this. For example, the controller 180 may understand the user's intention by sensing a direction that a wavelength of the voice 611 is transferred, analyzing an echo of a sound, or the like. That is, the controller 180 may determine whether or not the voice corresponds to a control command by analyzing an attribute of a user's voice input into the image display device 100'.

Hereinafter, description will be given of a method of controlling an output of audible data based on a voice, which is input into an external input device (i.e., the interface unit 170) for controlling the image display device 100', with reference to FIG. 10B.

When the external input device 170 is converted into a voice recognition mode, the controller 180 may receive a user's voice 670. The controller 180, which is included in the image display device 100' or the external input device 170, may restrict the output of audible data 607 by analyzing an attribute of the voice 670 or sensing a movement of the external input device 170.

For example, when the voice 670 corresponds to a control command for converting first screen information 503 into second screen information 504, the controller 180 may control the display unit 151, 151' to convert the first screen information 503 into the second screen information 504, and determine whether or not to output the audible data 607 which includes information indicating that the screen information has been converted (changed).

Referring to FIGS. 10B-C and 10B-D, the controller 180 may control the image display device 100' to restrict the output of the audible data 607 in such a manner of analyzing the voice 670 input into the external input device 170 or sensing whether or not the external input device 170 is located close to the user's mouth. That is, the controller 180 of the external input device 170 may restrict the output of a signal for outputting the audible data to the image display device 100'.

Hereinafter, description will be given of a control method for a device including a display unit 151 and an audio output module 153 in accordance with another exemplary embodiment. For example, a device 100" illustrated in FIG. 11 may correspond to an air conditioner and the like, without being limited to this. A voice 680 may correspond to a control command for controlling a function of the device. For example, the voice 680 may correspond to a control command for changing a temperature set in the air conditioner. Accordingly, the controller 180 may control the display unit 151, 151' to output the changed temperature based on the voice 680.

Figure 11:
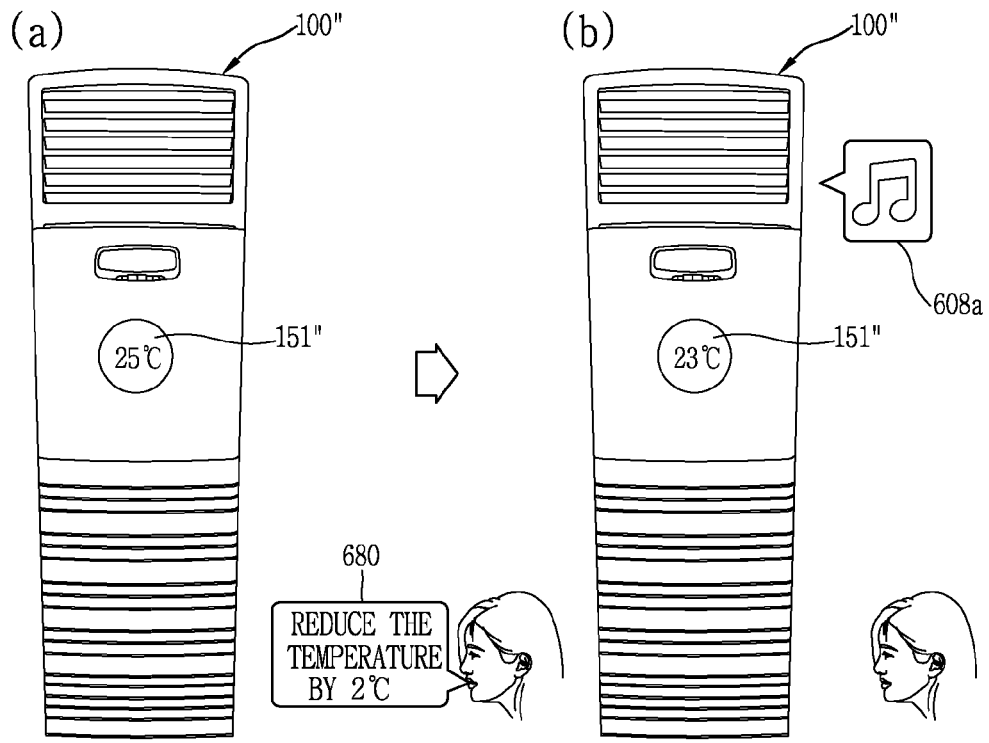
FIG. 11 is a conceptual view illustrating a control method of a device including a display unit and an audio output module in accordance with another exemplary embodiment.
Figure 11:
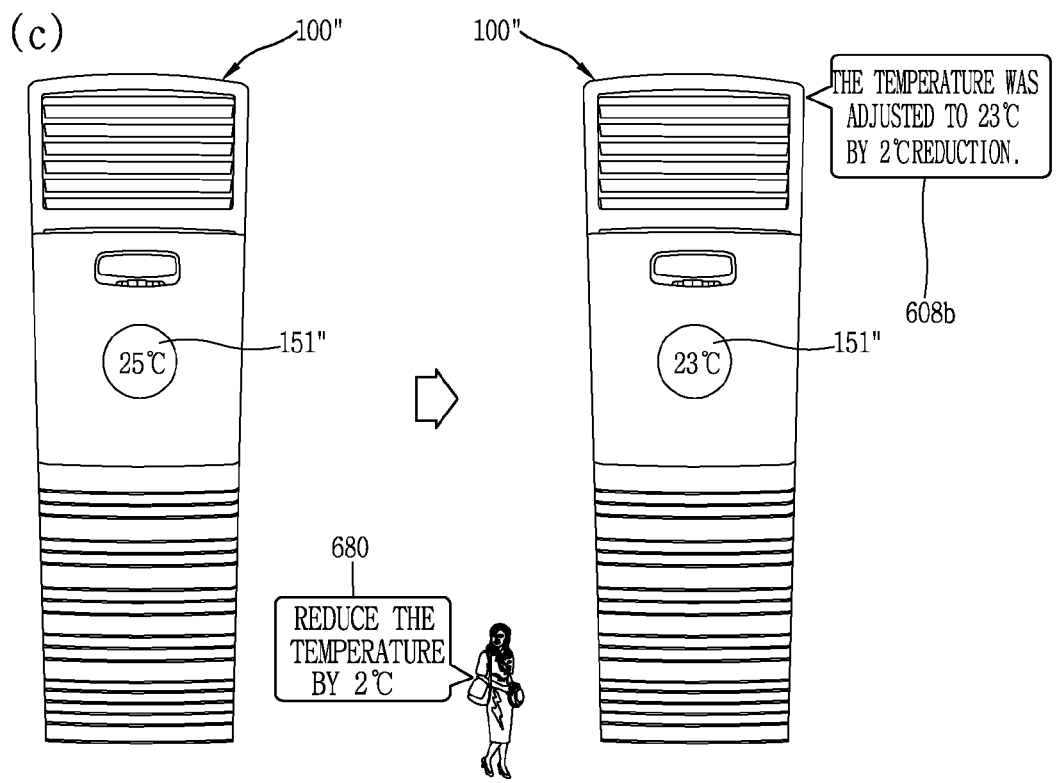

Referring to FIG. 11, the controller 180 of the device 100" may analyze an attribute of the voice 680 input into the device 100". For example, the controller 180 may determine a distance from the device 100" to the user from which the voice 680 comes.

Referring to FIGS. 11C and 11D, when the distance is longer than a preset distance, the controller 180 may control the audio output module 153 to output audible data 608*b* which is generated based on the voice 680.

On the other hand, when the distance belongs to a preset range, the controller 180 may control the audio output module 153 to restrict the output of the audible data 608*b*. Here, the controller 180 may also control the audio output module 153 to output a notification sound 608*a* based on the operation.

That is, the controller 180 may control the audible data to be output only when it is difficult for the user to check the operation with eyes.

The configurations and methods of the mobile terminal, the image display device and the like in the aforesaid embodiments may not be limitedly applied, but such embodiments may be configured by a selective combination of all or part of the embodiments so as to implement many variations.

What is claimed is:
1. A terminal comprising:
a main body;
a microphone disposed on a portion of a terminal and configured to receive a user's voice input for controlling an operation of the terminal when a program for recognizing the user's voice is activated;
an analyzing unit configured to analyze an attribute of the input voice;
a controller configured to generate visible data and audible data based on the received user's voice, the audible data corresponding to a sound signal generated by converting at least part of the visible data into a generated voice;

a display unit configured to display the visible data on an area apart from the microphone; and
a sensing unit configured to sense a degree of proximity between the user's mouth and the microphone while the user's voice is input and sense a movement and rotation of the main body while the user's voice is input;
wherein the controller is further configured to restrict the output of the audible data and control the display unit to display the visible data on another area closest to the microphone, when the degree of proximity is smaller than a preset range and a volume of the input voice is below a preset reference volume and when the movement and rotation of the main body is sensed, and
wherein the display unit is further configured to output previously generated visible data on a position changing away from the microphone in response to the input voice.

2. The terminal of claim 1, wherein the analyzing unit sorts the input voice based on a preset criterion, and
wherein the controller controls the output unit to restrict the output of the audible data when the input voice includes a preset attribute.

3. The terminal of claim 2, wherein the controller restricts the output of the audible data when the input voice is sorted as whispering including a rustling sound.

4. The terminal of claim 3, wherein the analyzing unit analyzes at least one of a nuance, speed, strength and degree of echo corresponding to the attribute of the input voice, and
wherein the input voice is sorted based on the present criterion to restrict the output of the audible data.

5. The terminal of claim 1, wherein the controller analyzes an external environment of the terminal based on an external sound input through the microphone, and restricts the output of the audible data based on the external environment.

6. The terminal of claim 5, wherein the controller controls the output unit to restrict the output of the audible data when a difference between a volume of the external sound and the volume of the input voice is below the reference volume.

7. The terminal of claim 5, wherein the controller controls the output unit to restrict the output of the audible data when the volume of the external sound is below the reference volume.

8. The terminal of claim 1, wherein the sensing unit further comprises a gyro sensor configured to sense movement and rotation of a main body of the terminal while the user's voice is input.

9. The terminal of claim 8, wherein the controller controls the output unit to adjust a volume of the audible data when the movement and rotation of the main body of the terminal is sensed by the gyro sensor.

10. The terminal of claim 1, wherein the controller controls the output unit to adjust a volume of the audible data to correspond to the volume of the input voice.

11. The terminal of claim 1, wherein the controller executes an operation based on the input voice, and controls the output unit to output text corresponding to the audible data while the output of the audible data is restricted.

12. The terminal of claim 11, wherein the output unit further outputs visible data corresponding to the audible data together with the text.

13. The terminal of claim 1, wherein the controller controls the output unit to output a notification sound indicating that an operation has been executed when the output of the audible data is restricted.

14. The terminal of claim 1, wherein the controller controls the output unit to output audible data indicating that an operation has been executed when the output of the audible data is restricted.

15. The terminal of claim 1, further comprising:
a face recognition unit configured to sense a user's face,
wherein the controller controls the output unit based on the input voice when the user's face is sensed as a front face by the face recognition unit, and
ignores the input voice when the user's face is not sensed as the front face.

16. A method of controlling a terminal having a main body, a microphone disposed on a portion of the terminal body and a display unit, the method comprising:
receiving a user's voice input through the microphone when a program of recognizing a user's voice is activated;
analyzing an attribute of the input voice;
generating visible data and audible data based on the received user's voice, the audible data corresponding to a sound signal generated by converting at least part of the visible data into a generated voice;
displaying the visible data on an area apart from the microphone;
sensing a degree of proximity between the user's mouth and the microphone while the user's voice is input and sensing a movement and rotation of the main body while the user's voice is input;
restricting an output of the audible data and displaying the visible data on another area closest to the microphone when the degree of proximity is smaller than a preset range and a volume of the input voice is below a preset reference volume while the voice is input and when the movement and rotation of the main body is sensed; and
outputting previously generated visible data on a position changing away from the microphone in response to the input voice.

17. The method of claim 16, wherein the analyzing of the attribute of the voice comprises:
determining whether or not the input voice is sorted as whispering including a rustling sound.

18. The method of claim 17, further comprising:
restricting the output of the audible data when the input voice is sorted as the whispering.

19. The method of claim 16, further comprising:
outputting text corresponding to the audible data when the output of the audible data is restricted.

20. The method of claim 16, further comprising:
outputting a notification sound indicating an execution of an operation when the output of the audible data is restricted.

* * * * *